United States Patent

Tsutsui

[11] Patent Number: 5,805,770
[45] Date of Patent: Sep. 8, 1998

[54] SIGNAL ENCODING APPARATUS, SIGNAL DECODING APPARATUS, RECORDING MEDIUM, AND SIGNAL ENCODING METHOD

[75] Inventor: Kyoya Tsutsui, Kanagawa, Japan

[73] Assignee: Sony Corporation, Tokyo, Japan

[21] Appl. No.: 448,531
[22] PCT Filed: Nov. 4, 1994
[86] PCT No.: PCT/JP94/01863
  § 371 Date: Jun. 14, 1995
  § 102(e) Date: Jun. 14, 1995
[87] PCT Pub. No.: WO95/12920
  PCT Pub. Date: May 11, 1995

[30] Foreign Application Priority Data

Nov. 4, 1993 [JP] Japan .................................. 5-275218

[51] Int. Cl.⁶ ........................................................ G10L 3/02
[52] U.S. Cl. ........................................ 395/2.33; 395/2.39
[58] Field of Search ................................. 395/2.33, 2.38, 395/2.39, 2.79, 2.77, 2.09, 2.1, 2.67, 2.76, 264; 341/50; 84/600

[56] References Cited

U.S. PATENT DOCUMENTS

| | | | |
|---|---|---|---|
| 4,184,049 | 1/1980 | Chrochiere et al. | 179/1 SA |
| 4,535,472 | 8/1985 | Tomcik | 381/31 |
| 4,577,343 | 3/1986 | Oura | 395/2.67 |
| 4,809,274 | 2/1989 | Walker et al. | 371/37 |

(List continued on next page.)

FOREIGN PATENT DOCUMENTS

| | | | |
|---|---|---|---|
| 0409248 A2 | 1/1991 | European Pat. Off. | H03M 7/30 |
| 0424016 A2 | 4/1991 | European Pat. Off. | H04B 1/66 |
| 0 446 031 A2 | 6/1991 | European Pat. Off. | H04B 1/66 |
| 0 446 031 A3 | 6/1991 | European Pat. Off. | G11B 21/21 |

(List continued on next page.)

OTHER PUBLICATIONS

Eurocon 88:8th European Conference on Electronics. Chmielewski et al., "Real Time Implementation of forward gain adaptive vector quantizer", pp. 40–43, Jun. 1988.
Patent Abstracts of Japan, vol. 13, No. 285 (E–780) JP 1069181 Published on Mar. 3, 1989, Fujitsu Ltd.

(List continued on next page.)

*Primary Examiner*—Allen R. MacDonald
*Assistant Examiner*—Richemond Dorvil
*Attorney, Agent, or Firm*—Limbach & Limbach L.L.P.

[57] ABSTRACT

In the signal encoding apparatus and the signal encoding method of this invention, normalization coefficients for normalizing a first signal are set to an interval finer than that of normalization coefficients for normalizing a second signal. Namely, accuracy of normalization coefficients at the time of normalizing tone characteristic components is caused to be higher than accuracy of normalization coefficients at the time of normalizing noise characteristic components. Thus, this invention can carry out efficient encoding. In other words, this invention can improve accuracy of encoding of tone characteristic components while suppressing the number of bits necessary for encoding of noise components. As a whole, more efficient encoding can be carried out. Moreover, in the recording medium of this invention, since signals efficiently encoded by the signal encoding apparatus or the signal encoding method of this invention are recorded, recording capacity is effectively utilized. In addition, in the signal decoding apparatus, since signals encoded by the signal encoding apparatus or the signal encoding method of this invention are decoded, signal error in decoding can be reduced.

22 Claims, 14 Drawing Sheets

U.S. PATENT DOCUMENTS

| | | | |
|---|---|---|---|
| 4,896,362 | 1/1990 | Veldhuis et al. | 381/30 |
| 4,972,484 | 11/1990 | Theile et al. | 381/37 |
| 5,040,217 | 8/1991 | Brandenburg et al. | 381/47 |
| 5,105,463 | 4/1992 | Velhuis et al. | 381/30 |
| 5,109,417 | 4/1992 | Fielder et al. | 395/2.42 |
| 5,115,240 | 5/1992 | Fujiwara et al. | 341/51 |
| 5,117,228 | 5/1992 | Fuchigami et al. | 341/200 |
| 5,128,963 | 7/1992 | Akagiri | 375/25 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/155 |
| 5,185,800 | 2/1993 | Mahieux | 381/29 |
| 5,222,189 | 6/1993 | Fielder | 395/2 |
| 5,230,038 | 7/1993 | Fielder et al. | 395/2.38 |
| 5,241,603 | 8/1993 | Akagiri et al. | 381/37 |
| 5,264,846 | 11/1993 | Oikawa | 395/2.13 |
| 5,268,685 | 12/1993 | Fujiwara | 395/2.38 |
| 5,285,476 | 2/1994 | Akagiri et al. | 375/25 |
| 5,294,925 | 3/1994 | Akagiri | 341/50 |
| 5,297,236 | 3/1994 | Antill et al. | 395/2.12 |
| 5,301,205 | 4/1994 | Tsutsui et al. | 375/1 |
| 5,311,561 | 5/1994 | Akagiri | 375/122 |
| 5,349,549 | 9/1994 | Tsutsui | 364/725 |
| 5,357,594 | 10/1994 | Fielder | 395/2.2 |
| 5,375,189 | 12/1994 | Tsutsui | 395/2.38 |
| 5,381,143 | 1/1995 | Shimoyoshi et al. | 341/51 |
| 5,394,473 | 2/1995 | Davidson | 381/36 |
| 5,414,795 | 5/1995 | Tsutsui et al. | 395/2.13 |
| 5,430,241 | 7/1995 | Furubashi et al. | 84/603 |
| 5,461,378 | 10/1995 | Shimoyoshi et al. | 341/51 |
| 5,471,558 | 11/1995 | Tsutsui | 395/2.28 |
| 5,479,562 | 12/1995 | Fielder et al. | 395/2.38 |
| 5,539,829 | 7/1996 | Lokhoff et al. | 381/2 |
| 5,559,900 | 9/1996 | Jayant et al. | 382/248 |
| 5,581,654 | 12/1996 | Tsutsui | 395/2.39 |
| 5,583,967 | 12/1996 | Akagiri | 395/2.38 |

FOREIGN PATENT DOCUMENTS

| | | | |
|---|---|---|---|
| 0458645 A2 | 11/1991 | European Pat. Off. | H04B 1/66 |
| 0473367 A1 | 3/1992 | European Pat. Off. | H03M 7/30 |
| 0506394 A2 | 9/1992 | European Pat. Off. | G10L 7/00 |
| 0525809 A2 | 2/1993 | European Pat. Off. | H04B 1/66 |
| 0653846 A1 | 5/1995 | European Pat. Off. | H03M 7/30 |
| 3-109824 | 5/1991 | Japan | H03M 7/30 |
| 3-132217 | 6/1991 | Japan | H03M 7/30 |
| 3-256411 | 11/1991 | Japan | H03M 7/30 |
| 3-263925 | 11/1991 | Japan | H03M 7/30 |
| WO 90/09064 | 8/1990 | WIPO | H04B 1/66 |
| WO 91/16769 | 10/1991 | WIPO | H04B 1/66 |
| WO 92/17884 | 10/1992 | WIPO | G11B 20/10 |

OTHER PUBLICATIONS

J. Rothweiler, "Polyphase Quadrature Filter—A New Sub-band Coding Technique," ICASSP vol. 3, Apr. 14–16, 1983, Boston, pp. 1280–1283.

G. Stoll et al., "Masking–Pattern Adapted Subband Coding: Use of the Dynamic Bit–Rate Margin," 84th Convention of Aes. Mar. 1–4, 1988, Paris, pp. 1–3.

R. Crochiere et al., "Digital Coding of Speech Sub–Bands," The Bell System Technical Journal, vol. 55, No. 8, Oct. 1976, p. 1069.

J. Princen et al., "Subband/Transform Coding Using Filter Bank Designs Based on Time Domain Aliasing Cancellation," ICASSP, vol. 4, Apr. 6–9, 1987, pp. 2161–2164.

R. Zelinski et al., "Adaptive Transform Coding of Speech Signals," IEEE Transactions on Acoutsics, Speech & Signal Processing, vol. ASSP–25, No. 4, Aug. 1977, pp. 299–309.

M. Krasner, "The Critical Band Coder—Digital Encoding of Speech Signals Based on the Perceptual Requirements of the Auditory System," IEEE vol. 1–3, Apr. 1980, pp. 327–331.

A. Knodoz et al., "A Robust Vector Quantized Sub–Band Coder for Good Quality Speech Coding at 9.6 KB/S," IEEE Jun. 13–17, 1988, Sweden, pp. 44–47.

A. Sugiyama et al., "Adaptive Transform Coding with an Adaptive Block Size (ATC/ABS)," IEEE Apr. 3–6, 1990, pp. 1093–1096.

M. Smith et al., "Exact Reconstruction Techniques for Tree–Structured Subband Coder," IEEE Transactions on Acoustics, Speech & Signal Processing, vol ASSP–34, No. 3, Jun. 1986, pp. 434–441.

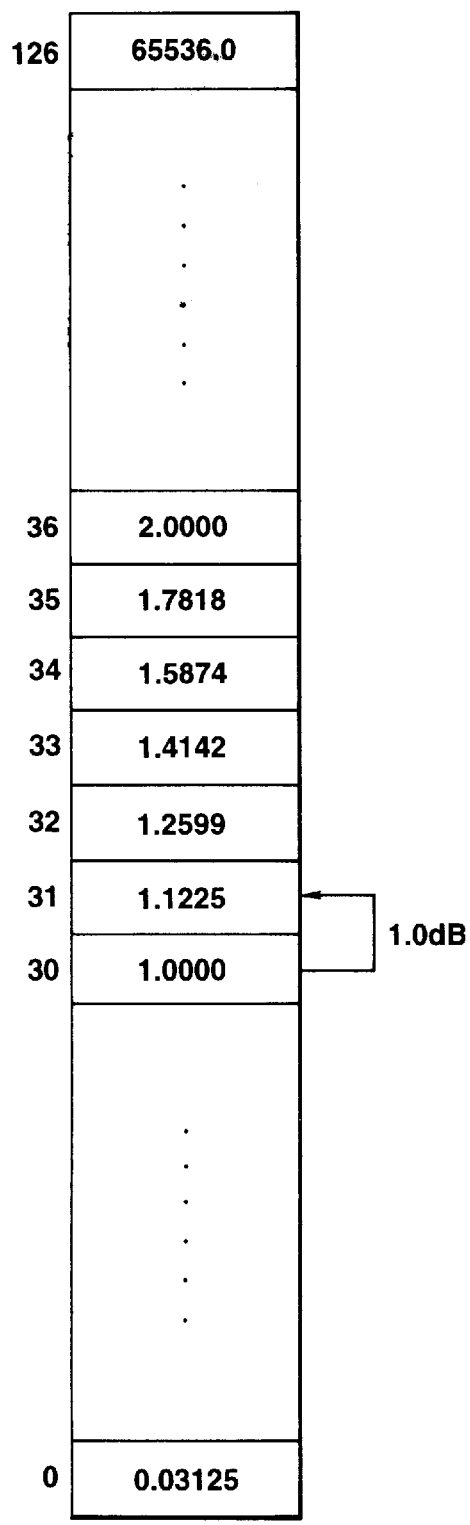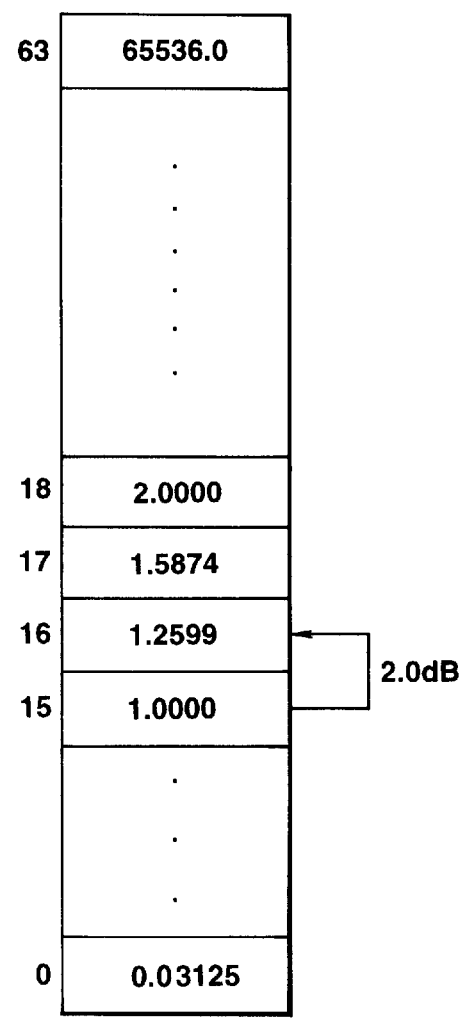
FIG.11(A)     FIG.11(B)

SIGNAL ENCODING APPARATUS, SIGNAL DECODING APPARATUS, RECORDING MEDIUM, AND SIGNAL ENCODING METHOD

TECHNICAL FIELD

This invention relates to a signal encoding apparatus and a signal encoding method for carrying out encoding of input digital data by so called an efficient encoding, a recording medium adapted so that such encoded signals are recorded therein, and a signal decoding apparatus adapted for decoding an encoded signal transmitted, or an encoded signal reproduced from such a recording medium.

BACKGROUND ART

Hitherto, there are various efficient encoding techniques for audio signals or speech signals, etc. For example, there are enumerated a Sub Band Coding (SBC) which is the non-blocking frequency band division system of dividing an audio signal on the time base, etc. into signals (signal components) in a plurality of frequency bands without carrying out blocking thereof in certain unit times to encode them, so called a transform encoding which is the blocking frequency band division system of dividing a signal on the time base into blocks every predetermined unit time to carry out transform (spectrum transform) processing into signals on the frequency base every respective blocks to divide them into signals (signal components) in a plurality of frequency bands to encode such signals every respective bands, and the like. Moreover, an efficient encoding technique in which the Sub Band Coding (SBC) and the transform encoding described above are combined is also proposed. In this case, e.g., an approach is employed to carry out band division by the Sub Band Coding thereafter to spectrum-transform signals every respective bands into signals on the frequency base to implement encoding to the spectrum-transformed signals every respective bands.

As a filter for band division used in the Sub Band Coding technique and the combined efficient encoding technique mentioned above, etc., there is, e.g., a filter so called QMF, etc. Such filter is described in, e.g., 1976 R.E. Crochiere Digital coding of speech in subbands Bell Syst. Tech. J. Vol. 55, No. 8, 1976. In addition, in, e.g., ICASSP 83, BOSTON Polyphase Quadrature filters—A new subband coding technique Joseph H. Rothweiler, a filter division technique of equal bandwidth is described.

Moreover, as the above-described spectrum transform processing, e.g., there is such a spectrum transform processing to divide an input audio signal into blocks every predetermined unit time (frame) to carry out, every respective blocks, Discrete Fourier Transform (DFT), Discrete Cosine Transform (DCT), or Modified DCT (MDCT), etc. to thereby transform signals on the time base into signals on the frequency base. The above-mentioned MDCT is described in ICASSP 1987 Subband/Transform Coding Using Filter Bank Designs Based on Time Domain Aliasing Cancellation J. P. Princen A. B. Bradley Univ. of Surrey Royal Melbourne Inst. of Tech.

By quantizing signals divided every bands by the filter or the spectrum transform processing in this way, it is possible to control a band or bands where quantizing noises take place, and to carry out more efficient encoding from a viewpoint of the hearing sense by making use of the property (phenomenon from an auditory point of view) such as the masking effect, etc. In such a case, when an approach is employed to carry out, prior to implementation of quantization, every respective bands, e.g., normalization by the maximum values of absolute values of signal components in corresponding bands, it is possible to carry out more efficient encoding.

Moreover, as a frequency division technique for quantizing respective frequency components which have been caused to undergo frequency band division, there is carried out, e.g., a band division in which the auditory (hearing) sense characteristic of the human being is taken into consideration. Namely, there are instances where an audio signal is divided into plural (e.g., 25) bands by bandwidths such that according as frequency shifts to higher frequency band side, bandwidths are broader, which are generally called critical bands. Further, in encoding data every respective bands at this time, encoding by a predetermined bit allocation is carried out every respective bands, or encoding by adaptive bit allocation is carried out every respective bands. For example, in encoding, by the bit allocation, coefficient data obtained after undergone the MDCT processing, encoding is carried out, by adaptive allocation bit numbers, with respect to MDCT coefficient data every respective bands obtained by MDCT processing every respective blocks.

As the above-mentioned bit allocation technique, the following two techniques are known. Namely, e.g., in IEEE Transactions of Acoustics, Speech, and Signal Processing, vol. ASSP-25, No. 4, August 1977, bit allocation is carried out on the basis of magnitudes of signals (signal components) every respective bands. In accordance with this system, while quantizing noise spectrum becomes flat so that noise energy becomes minimum, since the masking effect is not utilized from a viewpoint of the auditory sense, actual noise feeling is not optimum. Moreover, in, e.g., ICASSP 1980 The critical band coder—digital encoding of the perceptual requirements of the auditory system M. A. Kransner MIT, there is described a technique in which the auditory (hearing) sense masking is utilized to thereby obtain necessary signal-to-noise ratios every respective bands to carry out fixed bit allocation. However, with this technique, even in the case of measuring characteristic by sine wave input, since bit allocation is fixed, characteristic value does not become so satisfactory value.

To solve these problems, there is proposed, in EUROPEAN PATENT APPLICATION, Publication number 0 525 809 A2, Date of publication of application 03. 02. 93 Bulletin 93/05, an efficient encoding apparatus such that all bits which can be used for bit allocation are used under the state where they are divided into bits for fixed bit allocation pattern determined in advance every respective small blocks and bits for implementation of bit allocation dependent upon magnitudes of signals of respective blocks to allow the divisional ratio to be dependent upon a signal related to an input signal to allow the divisional ratio to the fixed bit allocation pattern to be greater according as spectrum of the signal becomes more smooth.

In accordance with this apparatus, in the case where energies are concentrated on a specific spectrum like sine wave input, a greater number of bits are allocated to blocks included in that spectrum, thereby making it possible to remarkably improve the entire signal-to-noise characteristic. Since the hearing sense of the human being is extremely sensitive to a signal having sharp spectrum component, improving the signal-to-noise characteristic by using such a method not only leads to improvement in numeric value in measurement, but also is effective for improvement of sound quality from a viewpoint of the auditory sense.

As the bit allocation method, a large number of methods are proposed in addition to the above. If model relating to the hearing sense is caused to be finer and the ability of the encoding apparatus is improved, more efficient encoding from a viewpoint of the hearing sense can be made.

A conventional signal encoding apparatus will now be described with reference to FIG. 15 and figures succeeding thereto.

In the FIG. 15 mentioned above, an acoustic signal waveform delivered through terminal 100 is transformed into signal frequency components by a transforming circuit 101. Thereafter, respective components are encoded by a signal component encoding circuit 102. Then, a code train is generated by a code train generating circuit 103 and the code train thus generated is outputted from terminal 104.

An actual configuration of the transforming circuit 101 of FIG. 15 is shown in FIG. 16. In the FIG. 16 mentioned here, a signal delivered through terminal 200 (signal caused to be through the terminal 100 of FIG. 15) is divided into signal components in three frequency bands by two stages of band division filters 201, 202. At the band division filter 201, the signal caused to be through the terminal 200 is caused to undergo thinning processing such that bandwidth is equal to one half (½). At the band division filter 202, one signal which has been caused to undergo thinning processing such that bandwidth is equal to one half (½) by the band division filter 201 is further caused to undergo thinning processing such that bandwidth is equal to one half (½) (the signal from the terminal 200 is caused to undergo thinning such that bandwidth is equal to one fourth (¼)). Namely, the bandwidths of two signals from the band division filter 202 are caused to be one fourth (¼) of the bandwidth of the signal from the terminal 200.

Signals of respective three bands divided as described above by these band division filters 201, 202 are caused to be spectrum signal components by spectrum transforming circuits 203, 204, 205 which respectively carry out spectrum transform processing such as MDCT; etc. Outputs of these spectrum transforming circuits 203, 204, 205 are sent to the above-mentioned signal component encoding circuit 102 of FIG. 15 respectively through terminals 206, 207, 208.

An actual configuration of the signal component encoding circuit 102 of FIG. 15 is shown in FIG. 17.

In the FIG. 17 mentioned above, an output from the transforming circuit 101 delivered to terminal 300 is caused to undergo normalization every predetermined bands by a normalizing circuit 301. The output thus normalized is then sent to a quantizing circuit 303. Moreover, the signal (output) delivered to the terminal 300 is sent also to a quantization accuracy determining circuit 302.

At the quantizing circuit 303, quantization is implemented to the signal from the normalizing circuit 301 on the basis of quantization accuracy calculated by the quantization accuracy determining circuit 302 from the signal caused to be through the terminal 300. An output from the quantizing circuit 303 is outputted from terminal 304 and is then sent to the code train generating circuit 103 of FIG. 15. It is to be noted that normalization coefficient information in the normalizing circuit 301 and/or quantization accuracy information in the quantization accuracy determining circuit 302 are also included in an output signal from the terminal 304 in addition to signal components quantized by the quantizing circuit 303.

Outline of the configuration of a signal decoding apparatus adapted for decoding an acoustic signal from a code train generated by the signal encoding apparatus as constituted in FIG. 15 to output the decoded acoustic signal is shown in FIG. 18.

In FIG. 18, from a code train generated by the signal encoding apparatus as constituted in FIG. 15 delivered through terminal 400, codes of respective signal components are extracted by a code train decomposing circuit 401. Respective signal components are restored (reconstructed) by a signal component decoding circuit 402 from those codes. Thereafter, inverse transform processing corresponding to transform processing at the transforming circuit 101 of FIG. 15 is implemented by an inverse transforming circuit 403. Thus, an acoustic waveform signal is obtained, and this acoustic waveform signal is outputted from terminal 404.

An actual configuration of the inverse transforming circuit 403 of FIG. 18 is shown in FIG. 19.

The configuration of FIG. 19 corresponds to the example of the configuration of the transforming circuit shown in FIG. 16. Signals delivered from the signal component decoding circuit 402 through terminals 501, 502, 503 are caused to respectively undergo transform processing by inverse spectrum transforming circuits 504, 505, 506 which carry out inverse spectrum transform processing corresponding to the spectrum transform processing in FIG. 16. Signals in respective bands obtained by these inverse spectrum transforming circuits 504, 505, 506 are synthesized by two stages of band synthesis filters 507, 508.

Namely, outputs of the inverse spectrum transforming circuits 505 and 506 are sent to the band synthesis filter 507, at which they are synthesized. Further, an output of the band synthesis filter 507 and an output of the inverse spectrum transforming circuit 504 are synthesized at the band synthesis filter 508. An output of the band synthesis filter 508 is outputted from terminal 509 (terminal 404 of FIG. 18).

FIG. 20 is a view for explaining an encoding method conventionally carried out in the signal encoding apparatus shown in FIG. 15. In the example of FIG. 20, spectrum signals are obtained by the transforming circuit 101 of FIG. 15, and levels of absolute values of spectrum signals by MDCT are shown in terms of dB values.

In FIG. 20, an input signal is transformed into 64 spectrum signals every predetermined time blocks. These spectrum signals are combined into groups (which are assumed to be called encoding units hereinafter) every five predetermined bands indicated by b1 to b5 of FIG. 20, and are caused to undergo normalization and quantization. In this example, bandwidths of respective encoding units are caused to be narrower on the lower frequency band side and are caused to be broader on the higher frequency band side. Thus, control of occurrence of quantizing noise in conformity with the property of the hearing sense is permitted to be carried out.

However, in the above-described method conventionally used, the band where frequency components are quantized is fixed. For this reason, e.g., in the case where spectrum components are concentrated on values in the vicinity of several specific frequencies, when attempt is made to quantize those spectrum components with sufficient accuracy, many bits must be allocated to a large number of components belonging to the same bands as bands to which those spectrum components belong.

Namely, as seen from the FIG. 20 mentioned above, when normalization is carried out collectively every predetermined bands, respective spectrum components are normalized, e.g., in the band of b3 in the figure where components of tone characteristic are included in the signal, on the basis of large normalization coefficient value determined by the tone characteristic component.

Here, noise included in an acoustic signal of tone characteristic where energies of spectrum components are concentrated on a specific frequency or frequencies is apt to be very offensive to the ear as compared to noise applied to an acoustic signal in which energies are gentry distributed over a broad frequency band. As a result, such noise constitutes great obstacle from a viewpoint of the hearing sense. Further, if spectrum components having large energy, i.e., tone characteristic components are not quantized with sufficiently high accuracy, in the case where those spectrum components are caused to be a waveform signal on the time base for a second time to synthesize it with blocks before and after, distortion between blocks becomes great (great connection distortion takes place when synthesized with waveform signals of time blocks adjacent thereto), similarly resulting in great obstacle from a viewpoint of the hearing sense. For this reason, quantization must be carried out by sufficiently greater number of bits for encoding of tone characteristic components. However, in the case where quantization accuracies are determined every predetermined bands as described above, it is required to allocate a greater number of bits to a large number of spectrum components within encoding units including tone characteristic components to carry out quantization, resulting in poor encoding efficiency. Accordingly, it was conventionally impossible to increase efficiency of encoding without degrading sound quality particularly with respect to acoustic signals of tone characteristic.

In view of the above, the applicant of this application has already proposed, in the specification and the drawings of the International Application No. PCT/JP94/00880 which has not yet been laid open, a method for realizing higher encoding efficiency by implementing encoding to an inputted acoustic signal under the state where the input acoustic signal is separated into signal components (tone characteristic components) where energies are concentrated on a specific frequency or frequencies and components (noise characteristic components) where energies are gently distributed over a broad band. Further, the applicant of this application has proposed, in the specification and the drawings of the Japanese Patent Application No. 241189/1993 which has not yet been laid open, a method in which the number of extraction of respective tone characteristic components is caused to be variable.

In the previously proposed specifications and drawings, there is described a method in which normalization and quantization are carried out every respective tone characteristic components. When such a method is employed, quantization can be implemented, with good accuracy, only to lesser number of spectrum components constituting tone characteristic components. Thus, it becomes possible to carry out encoding of good efficiency as compared to the methods which were used earlier.

Furthermore, the applicant of this application has already proposed, in the specification and the drawings of the International Application No. PCT/JP94/01056 which has not yet been laid open, several methods for further efficiently encoding the tone characteristic components. As one of these methods, there has been proposed a method in which attention is drawn to the fact that normalization coefficient is determined with the maximum spectrum component of spectrum components constituting respective tone characteristic components being as reference to encode only code information of plus and minus with respect to the maximum spectrum component of the respective tone characteristic components, and to omit encoding with respect to a quantized amplitude signal.

However, in the case where, with respect to the maximum spectrum components, encoding of a quantized amplitude signal is omitted, if accuracy of normalization coefficient is not sufficiently ensured, error at that portion would be increased. In order to sufficiently ensure accuracy of normalization coefficient, it is necessary to ensure sufficiently greater number of bits for encoding of normalization coefficient information itself. However, with respect to the noise characteristic component, since accuracy in the case where normalization and quantization are implemented is not primarily required to be so high, improvement in accuracy of normalization coefficient would lower efficiency of encoding.

DISCLOSURE OF THE INVENTION

This invention has been made in view of actual circumstances as described above, and an object of this invention is to provide a signal encoding apparatus and a signal encoding method in which accuracy of normalization coefficients particularly at the time of normalizing tone characteristic components is caused to be higher than accuracy of normalization coefficients at the time of normalizing noise characteristic components to thereby realize more efficient encoding, a recording medium adapted so that signals processed such a signal encoding apparatus are recorded therein, and a signal decoding apparatus adapted for decoding an encoded signal which is reproduced from such a recording medium, or is transmitted from a signal encoding apparatus.

A signal encoding apparatus of this invention is directed to a signal encoding apparatus adapted for encoding an input signal, wherein the apparatus comprises: transforming means for transforming the input signal into frequency components; separating means for separating an output of the transforming means into a first signal consisting of tone characteristic components and a second signal consisting of other components; first encoding means for normalizing and quantizing the first signal to encode it; and second encoding means for normalizing and quantizing the second signal to encode it, and wherein normalization coefficients for normalization of the first signal are set to an interval finer than that of normalization coefficients for normalization of the second signal.

Here, the first encoding means is such that, with respect to a signal component having a maximum energy of respective tone characteristic components of the first signal, it encodes information indicating plus or minus without encoding a quantized value thereof. Moreover, normalization coefficients for normalization of the first signal in the first encoding means are set to a value such that even if a quantized value of the signal component having the maximum energy is omitted, no error takes place at the time of decoding.

A recording medium of this invention is directed to a recording medium adapted so that encoded signals are recorded therein, wherein a first signal corresponding to tone characteristic components which have been normalized and quantized and a second signal corresponding to components except for the tone characteristic components, which have been normalized and quantized are recorded, and wherein normalization coefficients for normalization of the first signal are set to an interval finer than that of normalization coefficients of the second signal.

In this case, the first signal is such that, with respect to a signal component having a maximum energy of respective tone characteristic components, it includes indicating plus or minus without having a corresponding quantized value thereof. Moreover, normalization coefficients for normalization of the first signal are set to a value such that even if a quantized value of the signal component having the maximum energy is omitted, no error takes place at the time of decoding.

A signal decoding apparatus of this invention is directed to a signal decoding apparatus adapted for decoding an encoded signal, wherein the apparatus comprises: first decoding means for decoding a first signal corresponding to tone characteristic components which have been encoded through normalization and quantization; second decoding means for decoding a second signal corresponding to components except for the tone characteristic components, which have been encoded through normalization and quantization; and synthetic inverse transforming means for synthesizing an output of the first decoding means and an output of the second decoding means to implement inverse transform processing thereto, or for respectively inverse-transforming those outputs to synthesize them, and wherein the first decoding means carries out release of normalization at an interval finer than that of the second decoding means.

In this case, the first decoding means decodes, on the basis of information indicating plus and minus, a signal component having the maximum energy of respective tone characteristic components. Moreover, normalization coefficients included in the first signal are set to a value such that even if a quantized value of the signal component having the maximum energy is omitted, no error takes place at the time of decoding.

A signal encoding method of this invention is directed to a signal encoding method for encoding an input signal, wherein the method comprises the steps of: transforming the input signal into frequency components; separating the transformed signal into a first signal consisting of tone characteristic components and a second signal consisting of other components; and normalizing, and quantizing the first signal to encode it, and normalizing and quantizing the second signal to encode it, wherein normalization coefficients for normalization of the first signal are set an interval finer than that of normalization coefficients for normalization of the second signal.

In this case, with respect to a signal component having the maximum energy of respective tone characteristic components of the first signal, an approach is employed to encode information indicating plus and minus without encoding its quantized value. Moreover, normalization coefficients for normalization of the first signal are set to a value such that even if a quantized value of the signal component having the maximum energy is omitted, no error takes place at the time of decoding.

Signals handled in the signal encoding apparatus, the recording medium, the signal decoding apparatus and the signal encoding method of this invention are assumed to be an acoustic signal.

In addition, in accordance with this invention, encoding is carried out under the state where accuracy of normalization coefficient at the time of normalizing tone characteristic components is caused to be higher than accuracy of normalization coefficient at the time of normalizing other components (noise characteristic components).

BRIEF DESCRIPTION OF THE DRAWINGS

FIG. 11(A) and FIG. 11(B) are a view showing an example of normalization coefficient tables with respect to the tone characteristic component and the noise characteristic component.

BEST MODE FOR CARRYING OUT THE INVENTION

Preferred embodiments of this invention will now be described with reference to the attached drawings.

Figure 1:
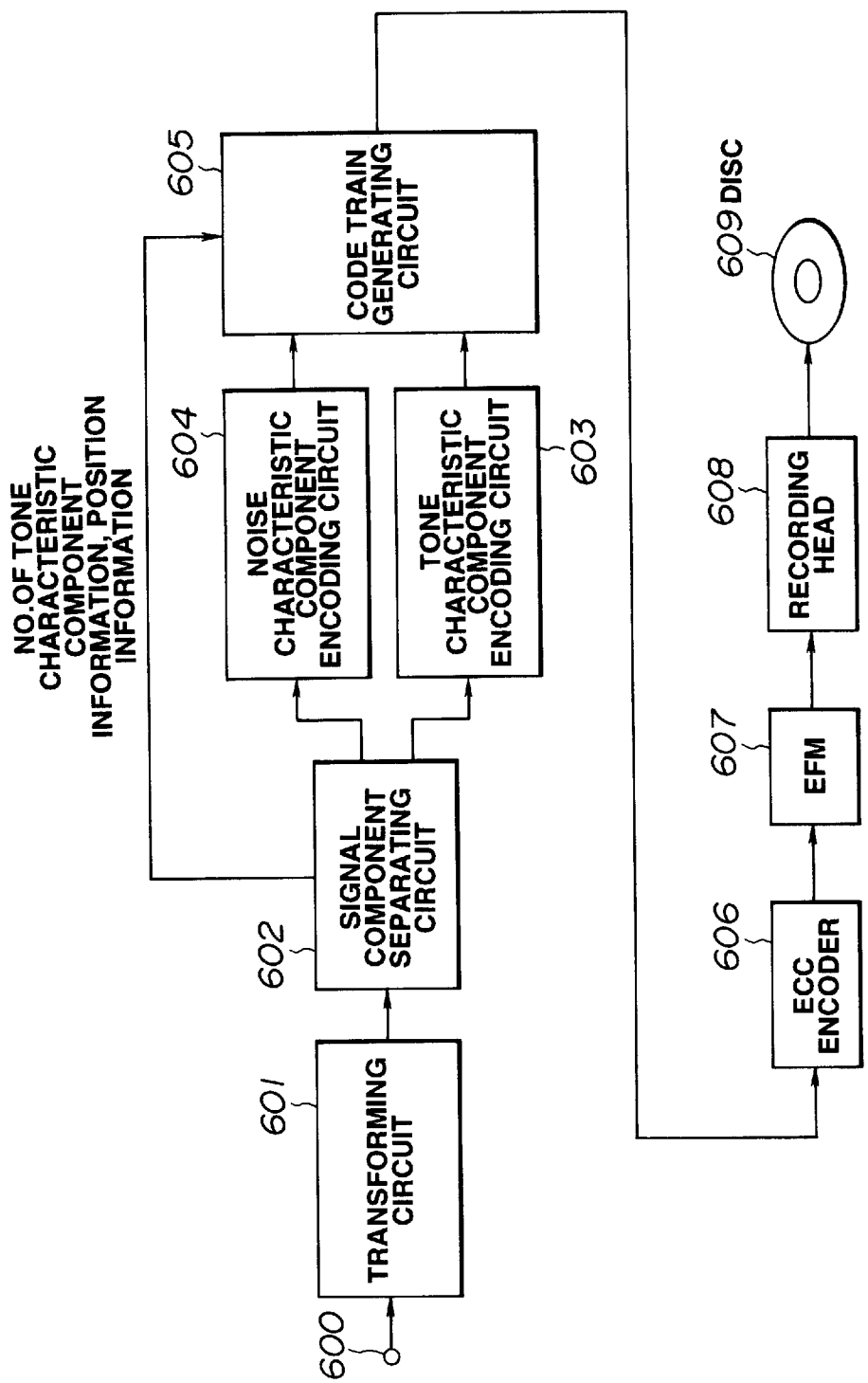
FIG. 1 is a block circuit diagram showing outline of the configuration of a signal encoding apparatus of an embodiment of this invention.

Outline of the configuration of a signal encoding apparatus of an embodiment of this invention is shown in FIG. 1.

Namely, the signal encoding apparatus of the embodiment of this invention comprises, as shown in FIG. 1, a transforming circuit 601 for transforming an input signal, e.g., an acoustic signal, etc. into frequency components, a signal component separating circuit 602 for separating an output of the transforming circuit 601 into tone characteristic components and noise characteristic components, a tone characteristic encoding circuit 603 for normalizing and quantizing the tone characteristic components to encode them, and a noise characteristic component encoding circuit 604 for normalizing and quantizing the noise characteristic components to encode them. In this case, normalization coefficients for normalization of the tone characteristic components are set to an interval finer than that of normalization coefficients for normalization of the noise characteristic component.

In the FIG. 1 mentioned above, an acoustic waveform signal is delivered to input terminal 600. This acoustic signal waveform is transformed into signal frequency components by the transforming circuit 601, and is then sent to the signal component separating circuit 602.

At this signal component separating circuit 602, the signal frequency components obtained by the transforming circuit 601 are separated into tone characteristic components having a sharp spectrum distribution and signal frequency components except for the above, i.e., noise characteristic components having a flat spectrum distribution. The tone characteristic components having sharp spectrum distribution of these separated frequency components are encoded at the tone characteristic component encoding circuit 603, and the noise characteristic components which are signal frequency components except for the above are encoded at the noise characteristic component encoding circuit 604. Outputs from the tone characteristic component encoding circuit 603 and the noise characteristic component encoding circuit 604 are sent to a code train generating circuit 605. Thus, a code train is generated by the code train generating circuit 605. This code train is outputted to an ECC encoder 606 as encoded information.

The ECC encoder 606 adds error correction code to the code train from the code train generating circuit 605. An output of the ECC encoder 606 is modulated by an EFM circuit 607, and is delivered to a recording head 608. The recording head 608 records, onto a disc 609, the code train outputted from the EFM circuit 607.

Figure 16:
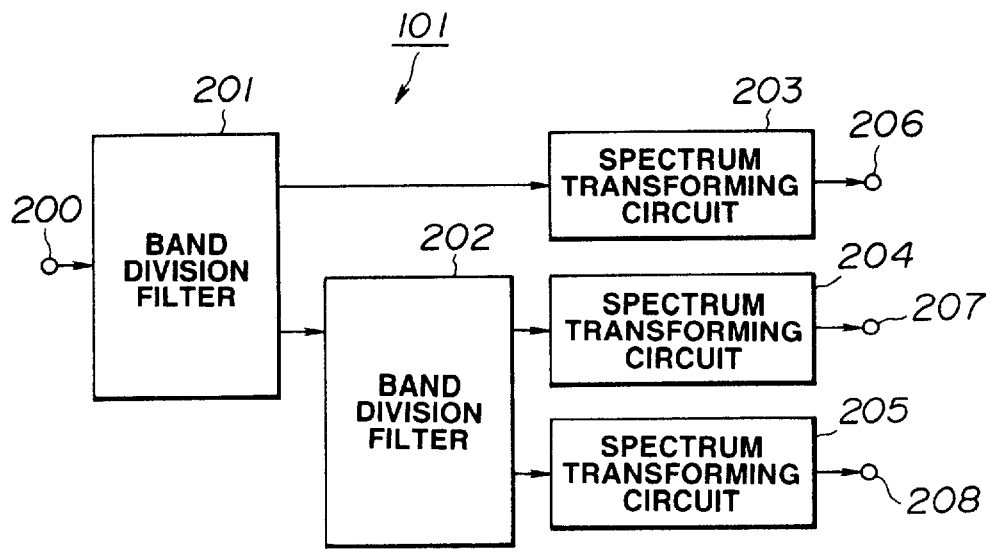
FIG. 16 is a block circuit diagram showing an actual configuration of a transforming circuit of the signal encoding apparatus of this embodiment and the prior art.

It is to be noted that, as the transforming circuit 601, configuration similar to that of FIG. 16 previously mentioned may be used. Of course, as an actual configuration of the transforming circuit 601 of FIG. 1, a large number of configurations may be conceivable in addition to the configuration of FIG. 16 mentioned above. For example, an input signal may be directory transformed into a spectrum signal by MDCT, and DFT or DCT, etc. may be employed in place of MDCT as spectrum transform processing.

Moreover, while a signal is divided into band components by the band division filter as previously described, since encoding in this invention is particularly effectively in the case where energies are concentrated on a specific frequency or frequencies, it is convenient to employ a method for carrying out transform processing into frequency components by the above-described spectrum transform processing in which a large number of frequency components are obtained by relatively lesser quantity of operations.

Figure 17:
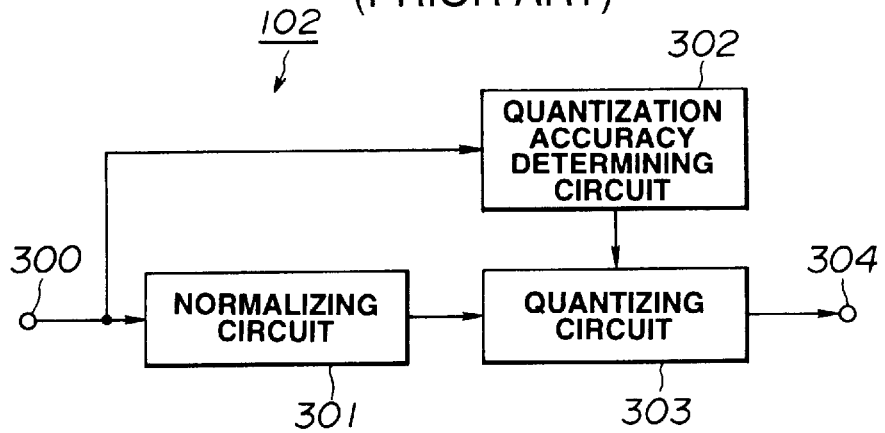
FIG. 17 is a block circuit diagram showing an actual configuration of a signal component encoding circuit of the signal encoding apparatus of this embodiment and the prior art.
Figure 18:
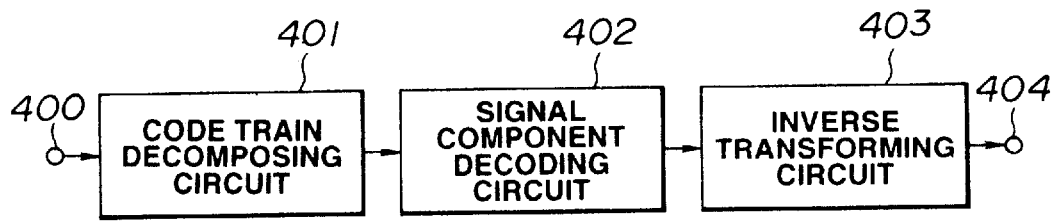
FIG. 18 is a block circuit diagram showing outline of the configuration of a conventional signal decoding apparatus.

Further, the noise characteristic component encoding circuit 604 may be fundamentally realized by a configuration similar to that of FIG. 17 previously mentioned. The configuration and the operation of the tone characteristic component encoding circuit 603 of this embodiment will be described later.

Figure 2:
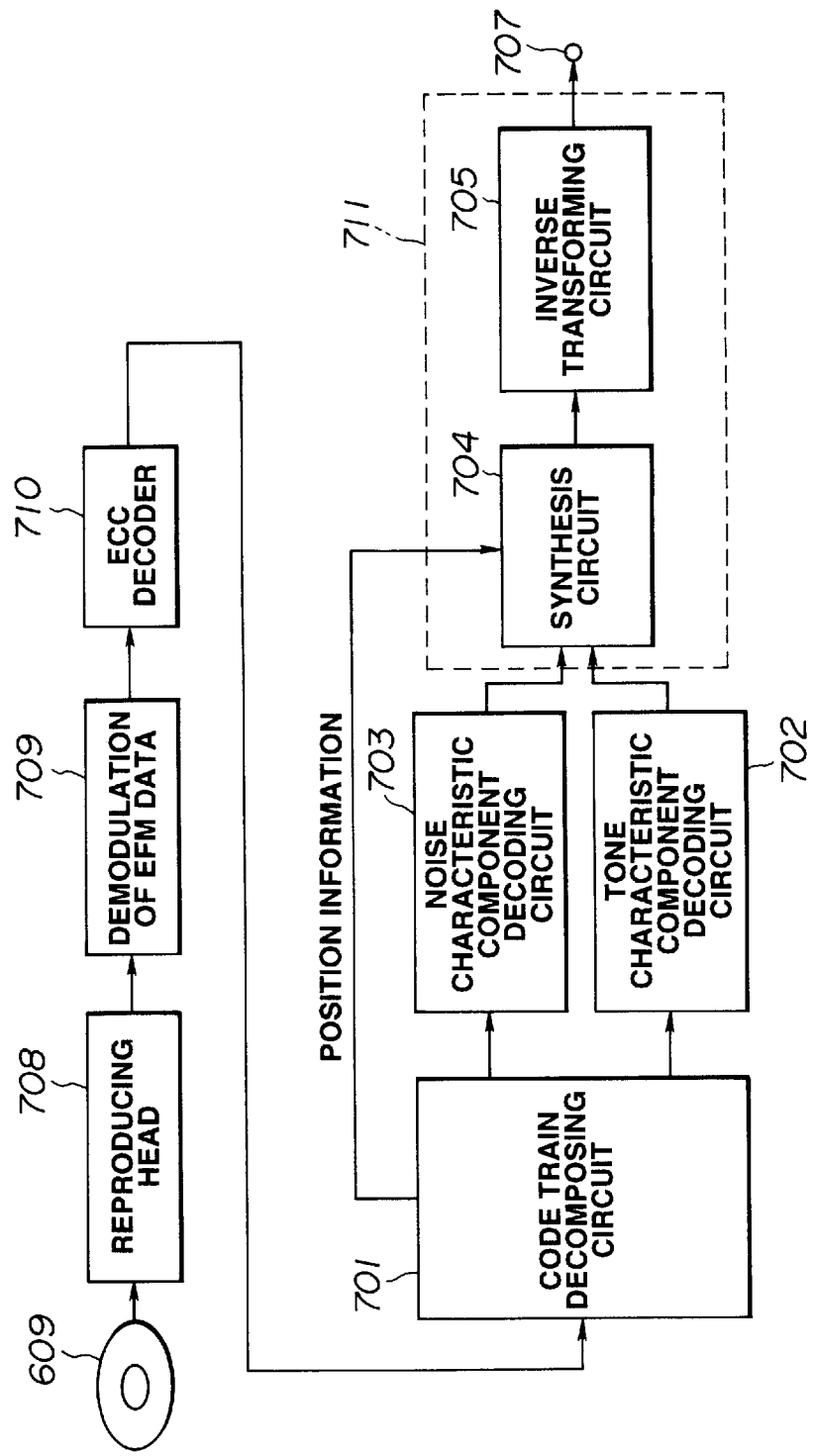
FIG. 2 is a block circuit diagram showing outline of the configuration of a signal decoding apparatus of an embodiment of this invention.

On the other hand, outline of the configuration of a signal decoding apparatus of an embodiment according to this invention, which is adapted for decoding a signal encoded by the signal encoding apparatus of this embodiment of FIG. 1 is shown in FIG. 2.

Namely, the signal decoding apparatus of the embodiment of this invention comprises, as shown in FIG. 2, a tone characteristic component decoding circuit 702 for decoding tone characteristic components which have been encoded through normalization and quantization by the signal encoding apparatus of this embodiment, a noise characteristic component decoding circuit 703 for decoding noise characteristic components which have been similarly encoded through normalization and quantization by the signal encoding apparatus of this embodiment, a synthesis circuit 704 for synthesizing tone characteristic components and noise characteristic components decoded by these respective decoding circuits 702, 703, and an inverse transforming circuit 705 for inverse-transforming an output of the synthesis circuit 704. Normalization coefficients for normalization at the time of encoding of the tone characteristic components decoded in this signal decoding apparatus are set to an interval finer than that of normalization coefficients of normalization at the time of encoding of the noise characteristic components.

In FIG. 2, a code train reproduced by a reproducing head 708 from the disc 609 is delivered to a circuit 709 for demodulating EFM data. The circuit 709 for demodulating EFM data demodulates the inputted code train. The demodulated code train is delivered to an ECC decoder 710, at which error correction is carried out. A code train decomposing circuit 701 recognizes, on the basis of No. of tone characteristic component information in the error corrected code train, which portion of the code train corresponds to tone characteristic component code to separate the inputted code train into tone characteristic component codes and noise characteristic component codes. Moreover, the code train separating circuit 701 separates position information of tone characteristic components from the inputted code train to output it to a synthesis circuit 704 of the succeeding stage.

The above-mentioned tone characteristic component code is sent to a tone characteristic component decoding circuit 702, and the noise characteristic code is sent to a noise characteristic component decoding circuit 703, at which release operations of inverse quantization and normalization are respectively carried out and those codes are decoded. Thereafter, decoded signals from the tone characteristic component decoding circuit 702 and the noise characteristic component decoding circuit 703 are delivered to a synthesis circuit 704 for carrying out synthesis corresponding to the separation at the signal component separating circuit 602 of FIG. 1 mentioned above. The synthesis circuit 704 adds, on the basis of position information of tone characteristic component delivered from the code train separating circuit 701, the decoded signal of the tone characteristic component to a signal portion at a predetermined position of the decoded signal of the noise characteristic component to thereby carry out synthesis on the frequency base of the noise characteristic component and the tone characteristic component. Further, the synthesized decoded signal is caused to undergo transform processing at an inverse transforming circuit 705 for carrying out inverse transform processing corresponding to transform processing at the modulating circuit 601 of FIG. 1 mentioned above so that it is caused to be the original waveform signal on the time base for a second time from the signal on the frequency base. An output waveform signal from the inverse transforming circuit 705 is outputted from terminal 707.

Figure 21:
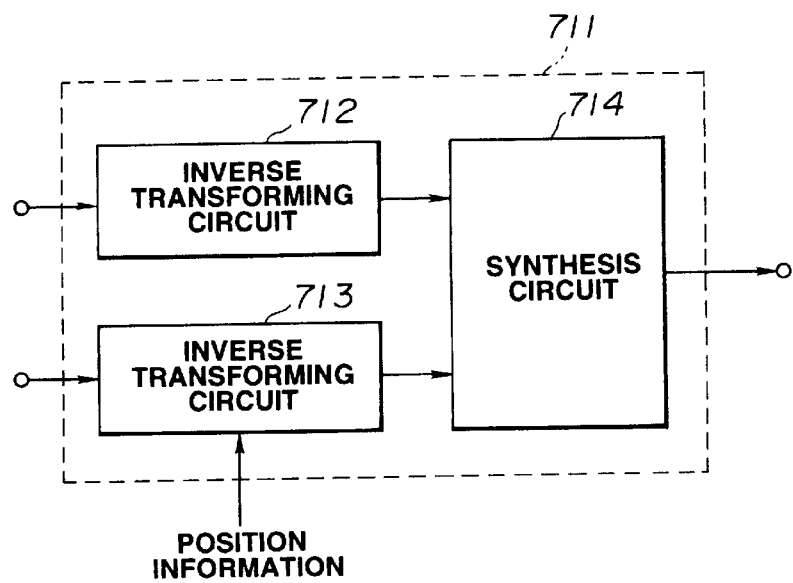
FIG. 21 is a block circuit diagram showing another actual configuration of a synthetic inverse transforming section constituting the signal decoding apparatus of this embodiment.

It should be noted that processing order of inverse transform and synthesis may be opposite to the above. In this case, synthetic inverse transforming section 711 in FIG. 2 is constituted as shown in FIG. 21. An inverse transforming circuit 712 inverse-transforms a decoded signal of noise characteristic component on the frequency base from the noise characteristic component decoding circuit 703 into a noise characteristic component signal on the time base. An inverse transforming circuit 713 allocates the decoded signal of tone characteristic component from the tone characteristic component decoding circuit 702 at a position on the frequency base indicated by position information of the tone characteristic component delivered from the tone characteristic component decoding circuit 702 to inverse-transform it, thus to generate a tone characteristic component signal on the time base. A synthesis circuit 714 synthesizes the noise characteristic component signal on the time base from the inverse-transforming circuit 712 and the tone characteristic component signal on the time base from the inverse-transforming circuit 713 to reproduce the original waveform signal.

Figure 19:
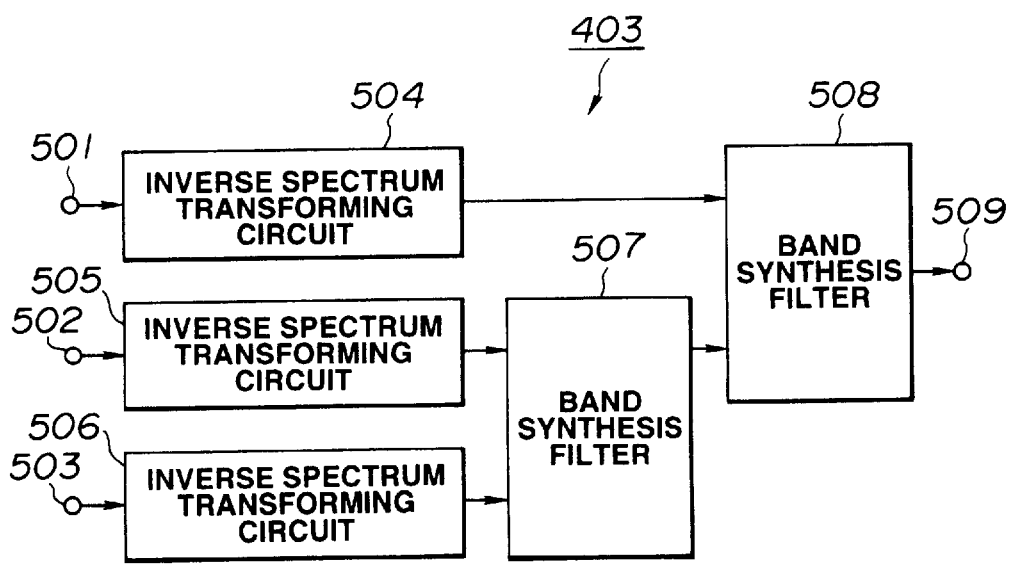
FIG. 19 is a block circuit diagram showing an actual configuration of an inverse transforming circuit of the signal decoding apparatus of this embodiment and the prior art.
Figure 20:
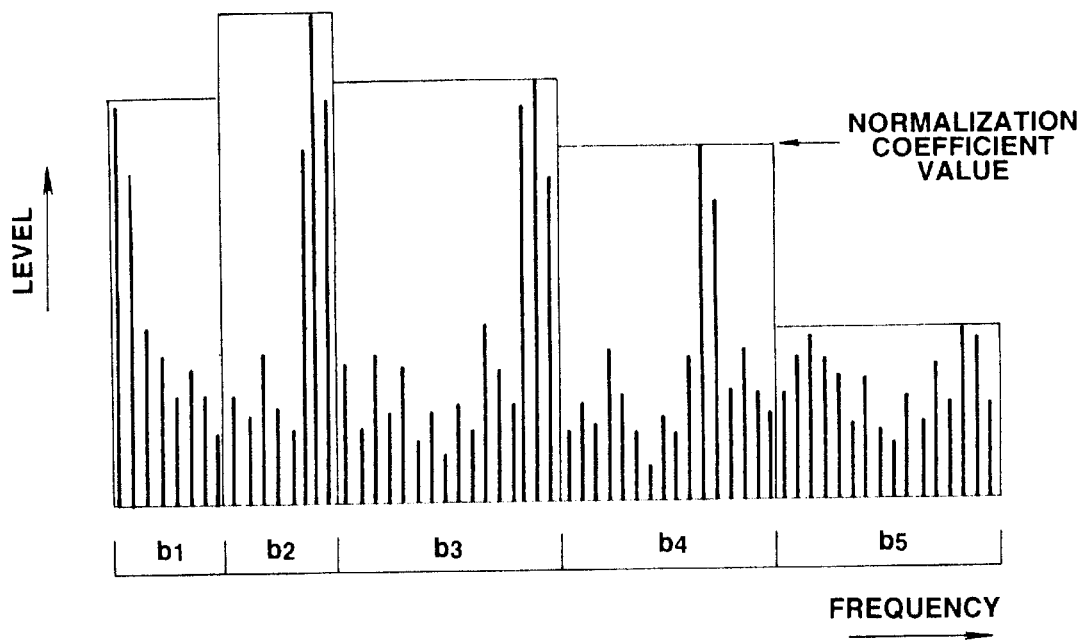
FIG. 20 is a view for explaining a method of encoding according to the prior art.

It is to be noted that a configuration similar to that of FIG. 19 previously mentioned may be used as the inverse-transforming circuit 705.

Figure 3:
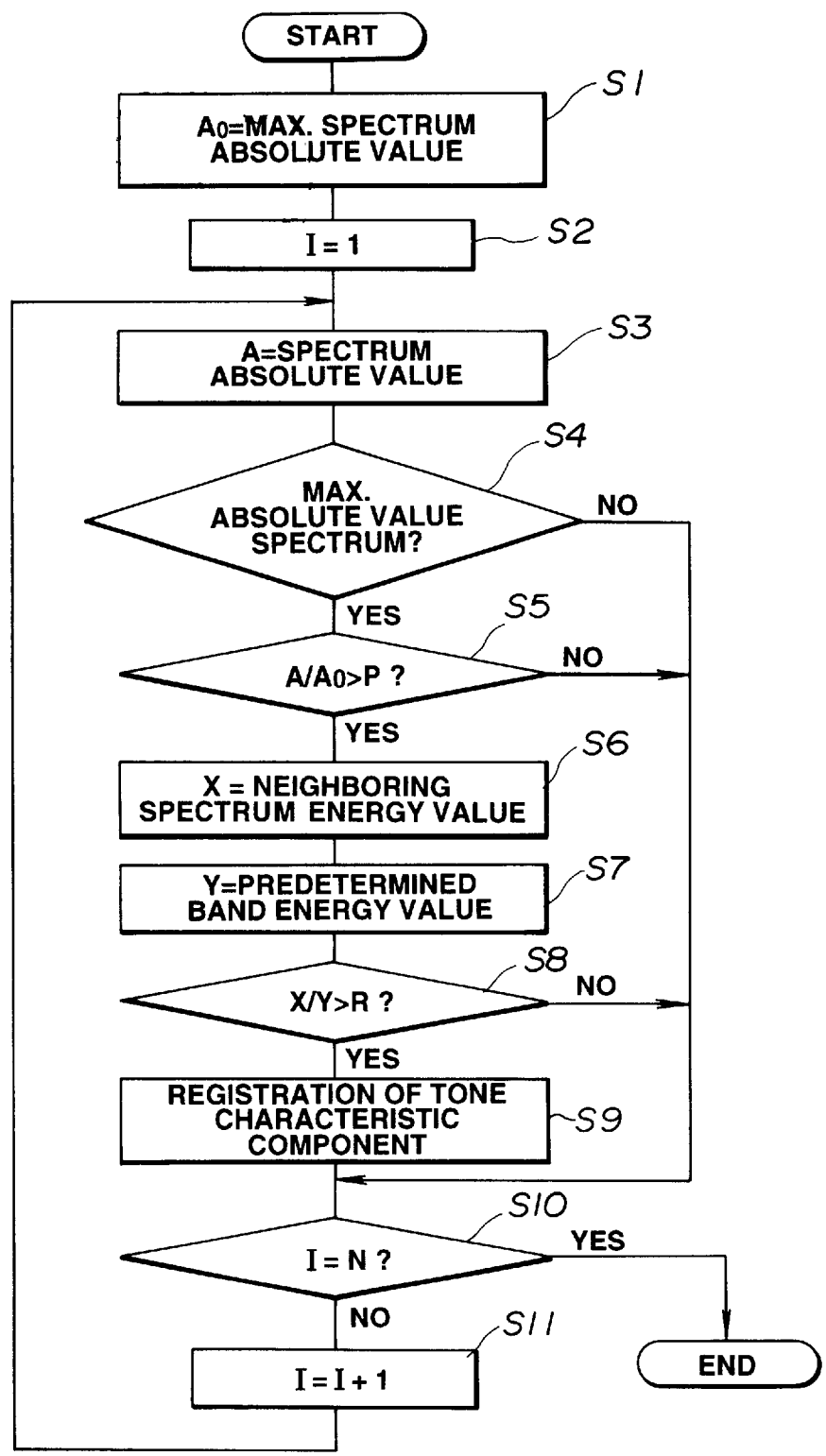
FIG. 3 is a flowchart showing flow of processing in a signal component separating circuit constituting the signal encoding apparatus.

The flowchart indicating flow of an actual processing for separating tone characteristic components in the signal component separating circuit 602 of the signal encoding apparatus of FIG. 1 is shown in FIG. 3.

In FIG. 3, I denotes No. of spectrum signal, N denotes total number of spectrum signals, and P, R denote predetermined coefficients. Moreover, the tone characteristic component is defined so that in the case where an absolute value of a certain spectrum signal is greater than other spectrum components when locally viewed, such an absolute value is a predetermined magnitude or more as compared to the maximum value of an absolute value of a spectrum signal within a corresponding time block (block in spectrum transform processing), and sum of energies of that spectrum component and neighboring spectrum components (e.g., spectrum components adjoining in both directions) indicates a predetermined ratio or more with respect to energy within a predetermined band including those spectrum components, that spectrum signal and, e.g., spectrum signals adjoining in both directions are considered to be the tone characteristic component. It is to be noted that, as a predetermined band for comparing ratio of energy distribution, setting may be made such that bands are caused to be narrower in lower frequency bands and bands are caused to be broader in higher frequency bands in correspondence with, e.g., critical bandwidths by taking the property of the hearing sense in consideration.

Namely, in the FIG. 3 mentioned above, first of all, as initialization, maximum spectrum absolute value is set to initial value $A_0$ at step S1, and No. I of the spectrum signal is set to 1 (initial value) at step S2.

At step S3, a spectrum absolute value within a certain time block is substituted for variable A. Thereafter, the processing operation proceeds to step S4.

At the step S4, whether or not the spectrum absolute value is maximum absolute value spectrum greater than other spectrum components when locally viewed is judged. When the spectrum absolute value is not the maximum absolute value spectrum (No), the processing operation proceeds to step S10. In the case where spectrum absolute value is the maximum absolute value spectrum (Yes), the processing operation proceeds to step S5.

At the step S5, comparison between a ratio between variable A of the maximum absolute value spectrum and initial value $A_0$ of the maximum spectrum absolute value within a corresponding time block including the maximum absolute value spectrum and coefficient P indicating a predetermined magnitude (value) ($A/A_0>P$) is carried out. In the case where $A/A_0$ is greater than P (Yes), the processing operation proceeds to step S6. In the case where $A/A_0$ is P or less (No), the processing operation proceeds to step S10.

At the step S6, energy value of neighboring spectrum components (e.g., sum of energies of spectrum components adjoining in both directions) of spectrum of the spectrum absolute value (maximum absolute value spectrum) is substituted for X. The processing operation proceeds to the next step S7.

At this step S7, the maximum absolute value spectrum and an energy value within a predetermined band including the neighboring spectrum components are substituted for variable Y.

At the next step S8, comparison between ratio between variable X of the energy value and variable Y of an energy value within a predetermined band and coefficient R indicating a predetermined ratio ($X/Y>R$) is carried out. When X/Y is greater R (Yes), the processing operation proceeds to step S9. When X/Y is R or less (No), the processing operation proceeds to step S10.

At the step S9, in the case where the energies in the maximum absolute value spectrum component and the neighboring spectrum components indicates a predetermined ratio with respect to an energy within a predetermined band including those spectrum components, a signal of the maximum absolute value spectrum and, e.g., signals of spectrum components adjoining in both directions are considered to be tone characteristic components to register the fact.

At the next step S10, whether or not number I of the spectrum signal registered at the step S9 and total number N of spectrum signals are equal to each other (I=N) is judged. In the case where they are equal to each other (Yes), the processing operation is completed. In the case where they are not equal to each other (No), the processing operation proceeds to step S11. At this step S11, I is set to I=I+1 to increment, by one, number of the spectrum signal. The processing operation returns to the step S3 to repeat the above-described processing.

The signal component separating circuit 602 delivers a frequency component judged to be tone characteristic component by the above-described processing to the tone characteristic component encoding circuit 603, and delivers frequency components except for the above to noise characteristic component encoding circuit 604 as noise characteristic component. Moreover, the signal component separating circuit 602 delivers No. of frequency information judged to be tone characteristic component and its position information to the code train generating circuit 605.

The state of an example where tone characteristic components are separated from frequency components in a manner as described above is shown in FIG. 4.

Figure 4:
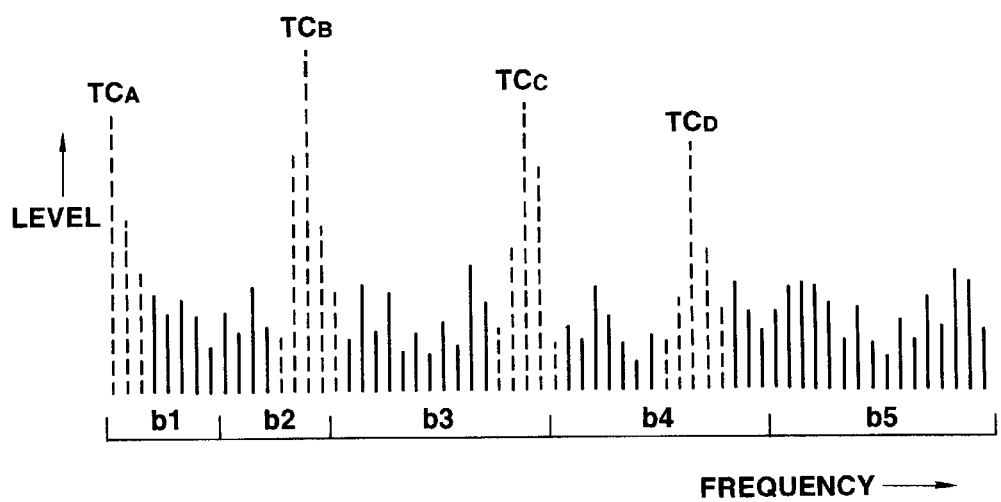
FIG. 4 is a view for explaining separation of tone characteristic components in the signal encoding of this embodiment.

In the example shown in FIG. 4, four tone characteristic components indicated by $TC_A$, $TC_B$, $TC_C$, $TC_D$ in the figure are extracted. In this case, since these tone characteristic components are distributed in a manner such that they are concentrated on lesser number of spectrum signals, even if these components are quantized with good accuracy, a greater number of bits are not so required. Moreover, an approach is employed to once normalize tone characteristic components thereafter to quantize them, thereby making it possible to improve efficiency of encoding. In this example, it is assumed that a spectrum signal existing at the center of respective tone characteristic components is a spectrum signal in which energy is maximum, which is called a maximum spectrum signal here, and other spectrum signals (neighboring spectrum signals) constituting the tone characteristic component are called peripheral spectrum signal.

Figure 5:
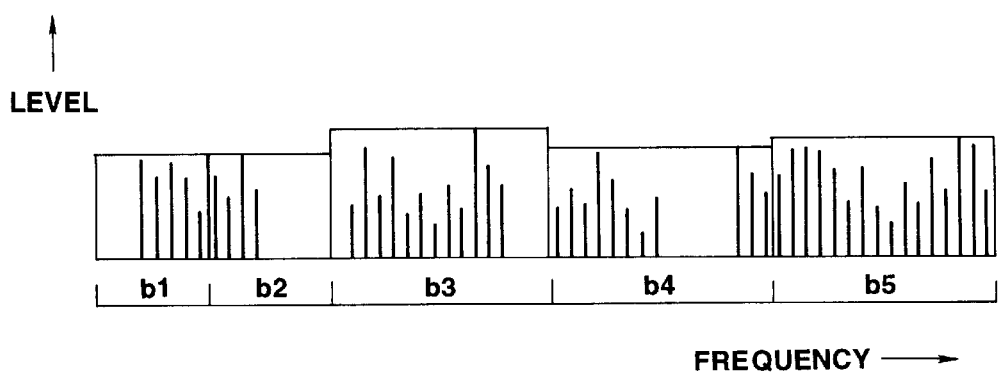
FIG. 5 is a view showing noise characteristic components in which tone characteristic components are excluded from an original signal in the signal encoding of this embodiment.

FIG. 5 shows the example indicating noise characteristic component in the case where the above-mentioned tone characteristic components are excluded (are nullified) from the original spectrum signal (spectrum signal of FIG. 4).

In the FIG. 5 mentioned above, since tone characteristic components (components indicated by dotted lines in FIG. 4) are excluded (are nullified) from the original spectrum signal (spectrum signal of FIG. 4) in respective bands b1~b5, normalization coefficients in the respective encoding units become small value. Accordingly, in the example of FIG. 5, even if the number of bits used for quantization is reduced, quantizing noise generated is permitted to be small. In addition, with respect to noise characteristic components, even if relatively great quantizing noises are mixed, since they are difficult to constitute obstacle from a viewpoint of the auditory sense, efficient encoding can be made even when a lesser number of bits are similarly employed.

While it has been described that tone characteristic components are separated to allow signals of tone characteristic components and in the vicinity thereof to be zero thereafter to encode noise characteristic components, thereby making it possible to realize efficient encoding, there may be employed a method in which signals obtained by encoding tone characteristic components (components indicated by dotted lines in FIG. 4) to decode the encoded component is subtracted from the original spectrum signal (spectrum signal of FIG. 4) are successively encoded.

Figure 22:
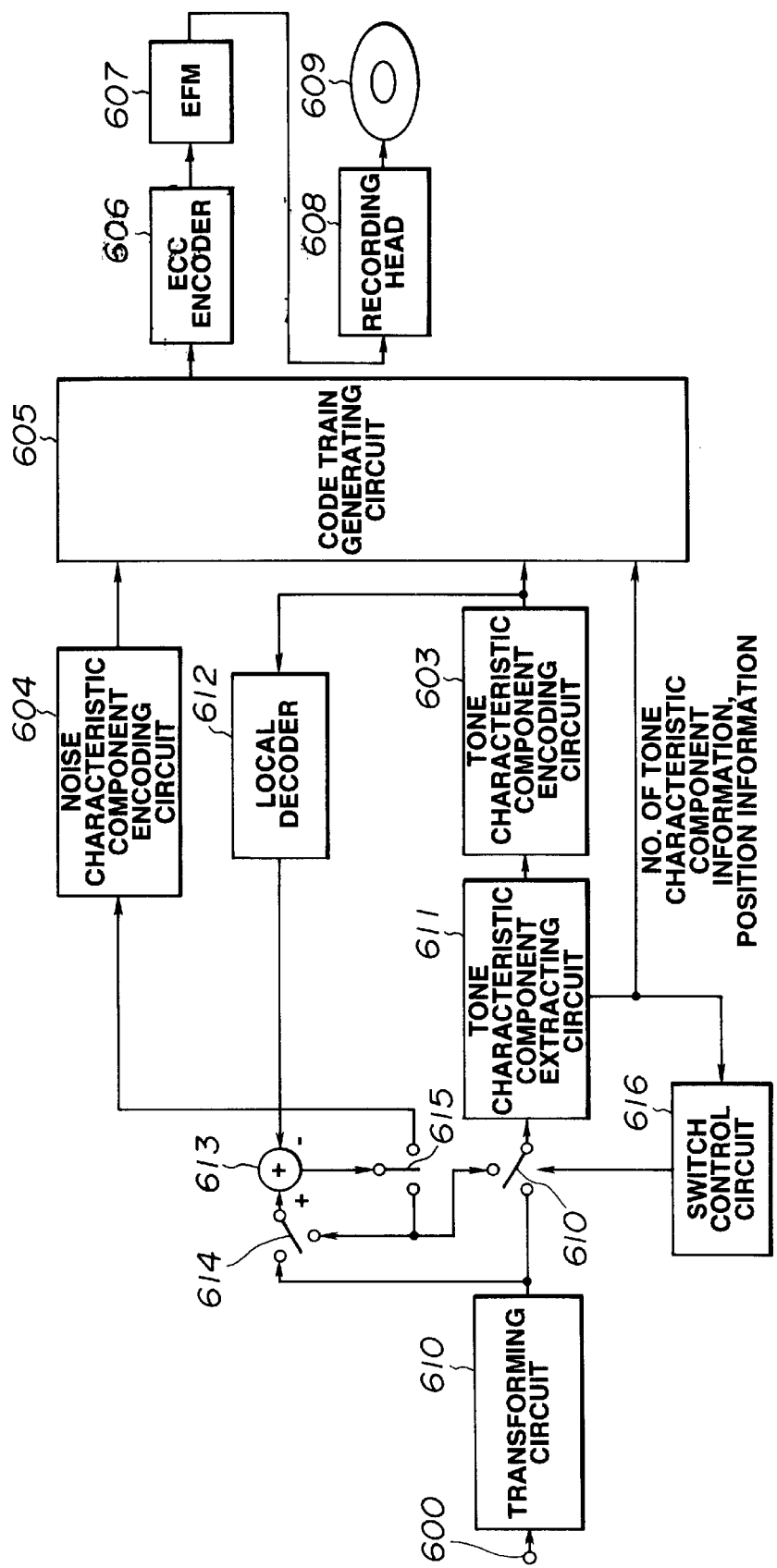
FIG. 22 is a block diagram showing outline of another configuration of the signal encoding apparatus of the embodiment of this invention.

A signal encoding apparatus by this method will now be described with reference to FIG. 22. The same reference numerals are respectively attached to the same components as those of FIG. 1 and their explanation is omitted.

A spectrum signal obtained by transforming circuit 601 is delivered to tone characteristic component extracting circuit 611 through a switch 610 controlled by a switch control circuit 616. The tone characteristic component extracting circuit 611 discriminates tone characteristic components by the above-described processing of FIG. 3 to deliver only the discriminated tone characteristic components to tone characteristic encoding circuit 603. Moreover, the tone characteristic component extracting circuit 611 outputs No. of tone characteristic component information and its center position information to code train generating circuit 605.

The tone characteristic component encoding circuit 603 carries out normalization and quantization with respect to inputted tone characteristic components to deliver the normalized and quantized tone characteristic component to the code train generating circuit 605 and a local decoder 612.

The local decoder 612 carries out release of inverse quantization and normalization with respect to the normalized and quantized tone characteristic component to decode the original signal of tone characteristic component. At this time, any quantizing noise would be included in a decoded signal. An output from the local decoder 612 is delivered to an adder 613 as a first decoded signal. Moreover, the original spectrum signal from the transforming circuit 601 is delivered to the adder 613 through a switch 614 controlled by the switch control circuit 616.

The adder 613 subtracts the first decoded signal from the original spectrum signal to output a first difference signal. In the case where a processing sequence of extraction, encoding, decoding and determination of difference of the tone characteristic component is completed by execution of only one processing, the first difference signal is delivered to noise characteristic component encoding circuit 604 through a switch 615 controlled by the switch control circuit 616 as the noise characteristic component.

In the case where a processing sequence of extraction, encoding, decoding and determination of difference of the tone characteristic is repeated, the first difference signal is delivered to a tone characteristic component extracting circuit 611 through the switch 610. The tone characteristic component extracting circuit 611, the tone characteristic component encoding circuit 603 and the local decoder 612 carry out processing similar to the above-described processing. A second decoded signal thus obtained is delivered to the adder 613. Moreover, the first difference signal is delivered to the adder 613 through the switch 614. The adder 613 subtracts the second decoded signal from the first difference signal to output a second difference signal. In the case where a processing sequence of extraction, encoding, decoding and determination of difference of the tone characteristic component is completed by two times of executions thereof, the second difference signal is delivered to noise characteristic encoding circuit 604 through the switch 615 as the noise characteristic component.

In the case where a processing sequence of extraction, encoding, decoding and determination of difference of the tone characteristic component is further repeated, processing similar to the above-described processing is carried out by tone characteristic component extracting circuit 611, tone characteristic component encoding circuit 603, local decoder 612 and adder 613.

The switch control circuit 616 holds threshold value of No. of tone characteristic component information, and is adapted so that in the case where No. of tone characteristic component information obtained from the tone characteristic component extracting circuit 611 is above this threshold value, it controls the switch 615 so as to complete processing sequence of extraction, encoding, decoding and determination of difference of the tone characteristic component. Moreover, there may be employed a configuration in which at the time point when extraction of tone characteristic component is ceased in the tone characteristic component encoding circuit 603, a processing sequence of extraction, encoding, decoding and determination of difference of the tone characteristic component is caused to be completed.

Figure 6:
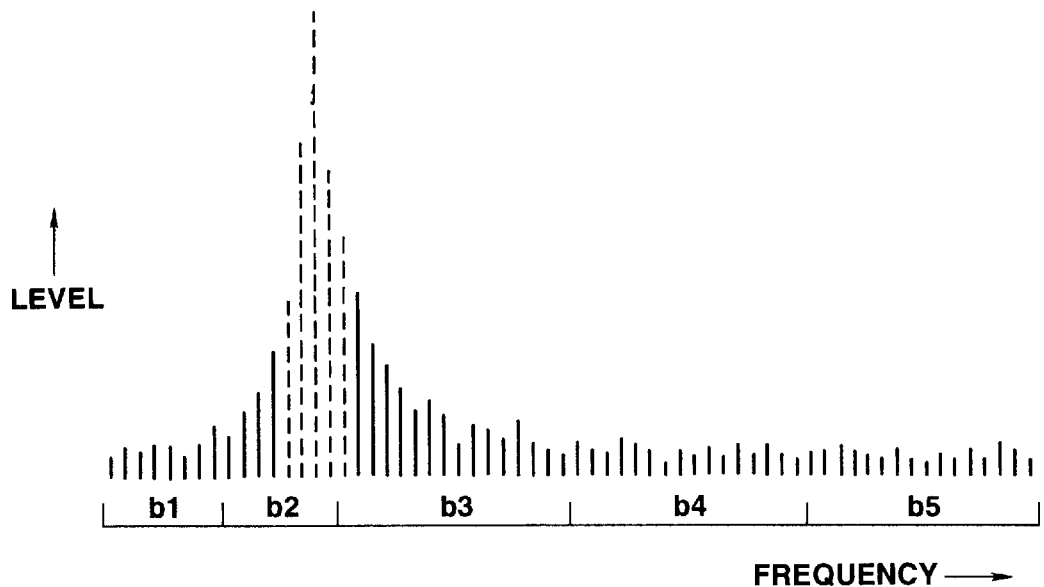
FIG. 6 is a view showing an example of a spectrum signal.
Figure 7:
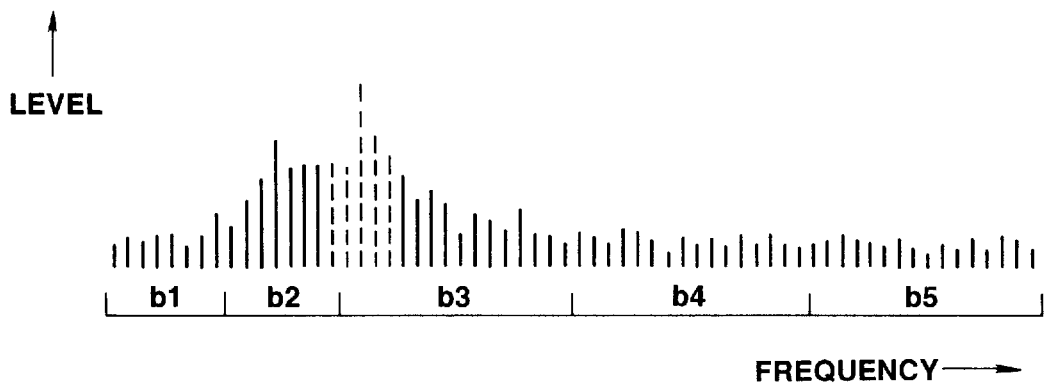
FIG. 7 is a view showing a signal after a signal obtained by encoding one tone characteristic component to decode it is subtracted from the spectrum signal of FIG. 6.

FIGS. 6 and 7 are views for explaining a method as described above. A signal obtained by subtracting, from the spectrum signal shown in FIG. 6, a signal obtained by encoding one tone characteristic component to decode it is shown in FIG. 7.

Further, a method is employed to further extract, as the tone characteristic component, components indicated by dotted lines in the figure from the spectrum signal of FIG. 7 to encode it, thereby making it possible to improve the encoding accuracy of the spectrum signal. By repeating such a method, it will become possible to carry out higher accuracy encoding. It should be noted that in the case where such a method is used, even if upper limit of the number of bits for quantizing tone characteristic component is set to a lower value, encoding accuracy is permitted to be sufficiently high. Accordingly, the number of bits for recording the number of quantization bits can be also advantageously reduced. In addition, the method of extracting, in a manner of multi-stages, tone characteristic components in this way can be applied not necessarily only to the case where a signal equivalent to a signal obtained by encoding tone characteristic component to decode encoded component is subtracted from the original spectrum signal, but also to the case where a spectrum signal of an extracted tone characteristic component is caused to be zero. In the description of the embodiment of this invention, expression "signal from which tone characteristic components are separated", etc. is assumed to include both of the above-mentioned cases.

A method of normalizing and quantizing the tone characteristic component to encode it will now be described with reference to FIGS. 8–10.

Figure 8:
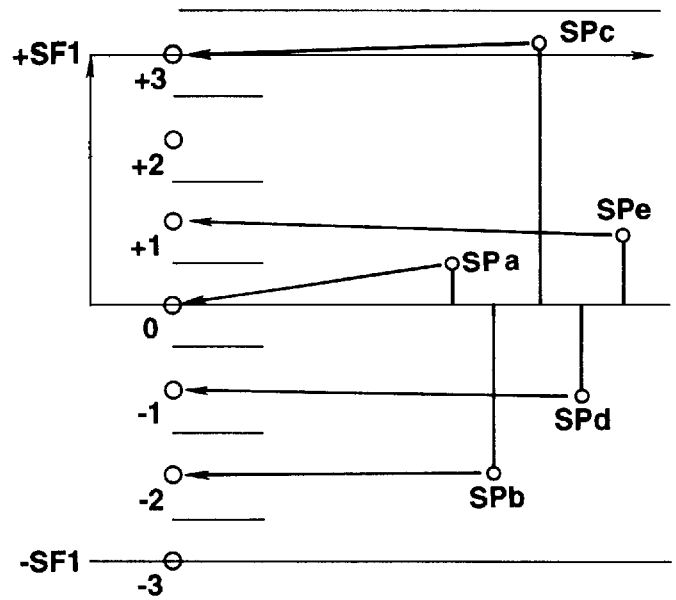
FIG. 8 is a view for explaining an encoding method according to this invention for normalizing and quantizing tone characteristic components to encode them.

Initially, a general example of normalization and quantization is shown in FIG. 8, wherein the state where encoding of five spectrum signals indicated by $SP_a$–$Sp_e$ in the figure is carried out is shown. In the example of FIG. 8, the middle spectrum signal $SP_C$ is a maximum spectrum signal of the tone characteristic component and scale factor SF1 is selected as normalization coefficient from the magnitude thereof. Respective spectrum signals $SP_a$–$Sp_e$ are normalized by the scale factor SF1, and is then quantized into any one of quantization steps of 7 stages from –3 to +3, and are thus encoded. Namely, spectrum signal $SP_C$ is quantized into +3, spectrum signal $SP_e$ is quantized into +1, spectrum signal $SP_a$ is quantized into 0, spectrum signal $SP_d$ is quantized into –1, and spectrum signal $SP_b$ is quantized into –2, and these signals are encoded.

The applicant of this application has proposed, in the specification and the drawings of the above-described International Application No. PCT/JP94/01056, a method in which attention is drawn to the fact that normalization coefficient is determined by the maximum spectrum signal to allow absolute value of the maximum spectrum signal to be magnitude of scale factor to encode only code of plus or minus to thereby realize a more efficient encoding. In accordance with this method, although in the case where the maximum spectrum signal is quantized and encoded with a given accuracy, it cannot be said that this maximum spectrum signal necessarily has the same absolute value as scale factor, there is employed the above-described method in which an operation to subtract a signal obtained by encoding tone characteristic component to decode the encoded component from the original spectrum signal is repeated to separate tone characteristic components thus to encode such error signal, thereby making it possible to eventually carry out encoding of sufficiently higher accuracy.

However, since the above-described method of subtracting, from the original spectrum signal, a signal obtained by encoding the tone characteristic component to decode it to thereby repeatedly separate tone characteristic components carries out encoding in an overlapping manner (repetitively) with respect to the same spectrum component, there is limitation in improvement of efficiency of encoding.

A signal encoding method according to this invention for avoiding inconveniences as described above will now be described with reference to FIGS. 9 and 10. FIGS. 9 and 10 show the relationship between accuracy of scale factor and value obtained by normalizing and quantizing a maximum spectrum signal. In FIG. 10, the example of the case where normalization coefficient table for tone characteristic component is used is shown. In FIG. 9, the example of the case where normalization coefficient table for noise characteristic component is assumed to be used for comparison with FIG. 10 is shown.

Figure 9:
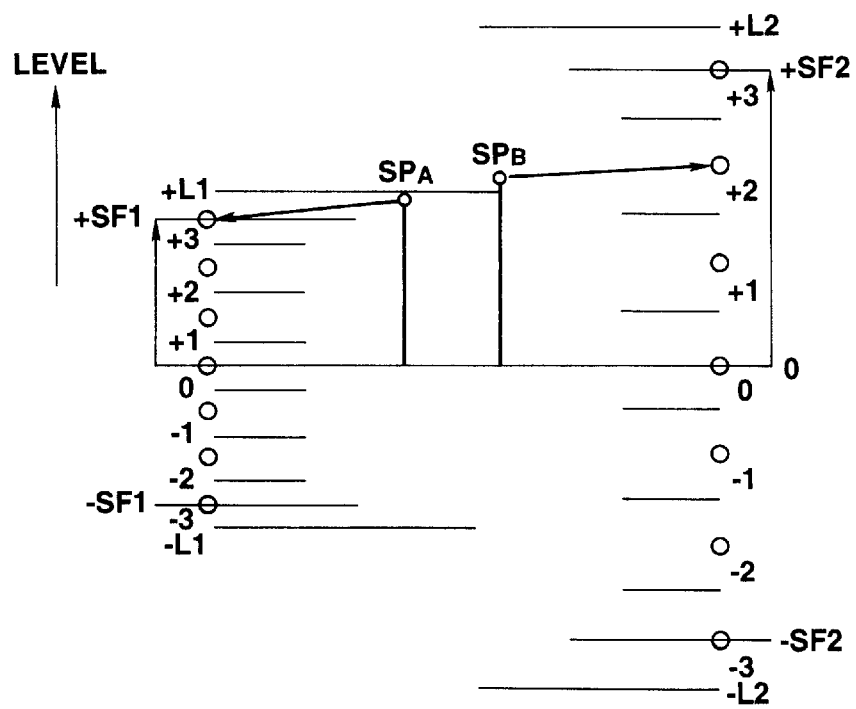
FIG. 9 is a view for explaining the example where error occurring at the time of decoding is increased.

Initially, in FIG. 9, as scale factor which can be used for normalization, scale factor SF2 is prepared as a value smaller next to the scale factor SF1. Namely, pitch width of scale factor in FIG. 9 is caused to be SF2–SF1.

In this case, with respect to maximum spectrum signal indicated by $SP_A$ in the figure which is not above, e.g., predetermined level L1, scale factor SF1 is selected. On the other hand, with respect to a maximum spectrum signal as indicated by $SP_B$ in the figure which exceeds the predetermined level L1, scale factor SF2 is selected. In the case where the scale factor SF2 is selected with respect to the maximum spectrum signal indicated by $SP_B$, when this scale factor is quantized by quantization steps of 7 stages in the range from –3 to +3, value (quantized value) of the maximum spectrum signal $SP_B$ becomes equal to +2.

However, at this time, in the case where, with respect to the maximum spectrum signal $SP_B$, its amplitude information (2 which is a quantized value of this amplitude information in this example) is omitted to encode only code of plus or minus (+ in this example), since a signal decoding apparatus used later carries out decoding by using an encoded value of the code of plus or minus and normalization coefficient information indicating the selected scale factor SF2, the value of the maximum spectrum signal $SP_B$ would be interpreted as +3 (3 based on + of the code of plus or minus and scale factor SF2) to decode it, resulting in large error.

Figure 10:
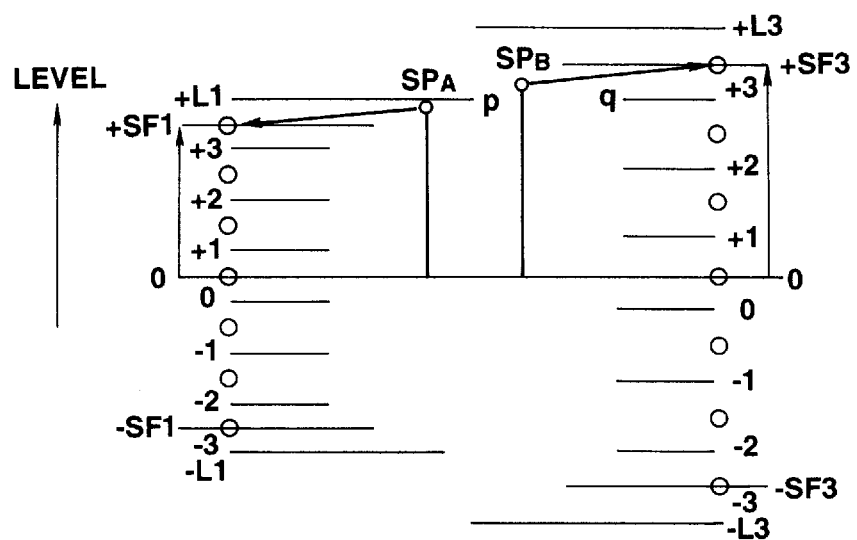
FIG. 10 is a view for explaining that occurrence of error at the time of decoding is suppressed by application of the encoding method according to this invention.

On the contrary, as scale factor which can be used for the normalization, scale factor SF3 which has a pitch smaller (finer) than the scale factor SF2 as shown in FIG. 10 is set as a value smaller next to scale factor SF1. Namely, a scale factor SF3 such that SF3–SF1<SF2–SF1 is set.

At this time, with respect to a maximum spectrum signal indicated by $SP_B$ in the figure which is above, e.g., predetermined level L1, scale factor SF3 will be selected. In the case where scale factor SF3 is selected with respect to the maximum spectrum signal $SP_B$, since amplitude of the maximum spectrum signal $SP_B$ and value of scale factor SF3 become close to each other, even if amplitude information of the spectrum signal $SP_B$ is omitted so that only code of plus or minus is encoded, there is no possibility that error may be increased by later decoding (decoding through reproduction after recording onto a recording medium). In the case of the example of FIG. 10, in the case where the scale factor SF3 is selected with respect to maximum spectrum signal $SP_B$, when this scale factor is quantized into quantization steps of 7 stages in the range from –3 to +3, value (quantized value) of the maximum spectrum signal $SP_B$ becomes equal to +3. At this time, in the case where, with respect to the maximum spectrum signal $SP_B$, its amplitude information (3 which is quantized value of the amplitude information in this example) is omitted to encode only code of plus or minus (+ in this example), the signal decoding apparatus used later carries out decoding by using an encoded value of the code of plus or minus and information indicating the selected scale factor SF3. Namely, the signal decoding apparatus interprets value of the maximum spectrum signal $SP_B$ as +3 (3 based on + of the code of plus or minus and scale factor SF3) to decode it. Accordingly, there is no possibility that error may be increased.

Here, what width of scale factor is set in order to suppress occurrence of error at the time of decoding is determined by the number of quantization steps with respect to the maximum spectrum. For example, in the case of carrying out linear quantization by the number (=7) of quantization steps as shown in FIG. 10, if level indicated by q in FIG. 10 is not higher than level (predetermined level L1) indicated by p in the figure, even if amplitude information of the maximum spectrum is omitted, no error takes place.

Accordingly,

SF3*(N−2)/(N−1)≦SF1*N/(N−1)

Namely,

SF3≦SF1*N/(N−2)

if scale factor is set so as to satisfy the relationship described above, even if amplitude information of the maximum spectrum signal is omitted, no error takes place at the time of decoding.

While explanation has been given in connection with the linear quantization, also in the case of non-linear quantization, it is of course possible to similarly determine the condition permitting omission of amplitude information of the maximum spectrum signal from the quantization width thereof.

Moreover, even in the case where error due to omission of amplitude information does not necessarily disappear, scale factor is set so that they have sufficiently small pitches, thereby permitting that error to be sufficiently small. This is advantageous in efficiently encoding spectrum signals important from a viewpoint of the hearing sense.

Since the human being is generally more sensitive with respect to distortion of the tone characteristic component, it is desirable that the number of quantization steps of the tone characteristic component is greater than the number of quantization steps of the noise characteristic component. In the case where the number of quantization steps is great, error when amplitude information of maximum spectrum is omitted can be reduced by allowing the scale factor to also have small pitch as previously described. Namely, in accordance with the signal encoding method according to this invention, scale factor with respect to the tone characteristic component is set to a width finer (smaller) than scale factor with respect to the noise characteristic component to thereby realize more efficient encoding.

Moreover, a method of setting normalization coefficient of the tone characteristic component in a manner of small pitch is effective also for improving accuracy of peripheral spectrum signals of the tone characteristic component. Also in this respect, such a setting method is convenient in encoding tone characteristic components important from a viewpoint of auditory sense.

It is sufficient that what width of scale factor is actually set is determined from, e.g., the maximum number of steps at the time of quantizing tone characteristic components. A greater number of scale factors with respect to the noise characteristic component are not unnecessarily set, thereby permitting the number of bits in the case of encoding scale factor with respect to the noise characteristic component not to be increased.

An actual example of normalization coefficient tables with respect to the tone characteristic component and the noise characteristic component is shown in FIG. 11(A) and FIG. 11(B). Namely, normalization coefficient table with respect to the tone characteristic component is shown in FIG. 11A and normalization coefficient table with respect to the noise characteristic component is shown in FIG. 11B.

In the FIG. 11(A) and FIG. 11(B) mentioned above, scale factor is set to 1.0 dB pitch with respect to the tone characteristic components, and is set to 2.0 dB pitch with respect to the noise characteristic components. In this embodiment, in the case where linear quantization is carried out as described above, and in the case where the number N of steps of quantization is, e.g., 15, since the following relationship holds,

N/(N−2)=1.1538 . . .

amplitude information of the maximum spectrum signal can be omitted without error.

Figure 12:
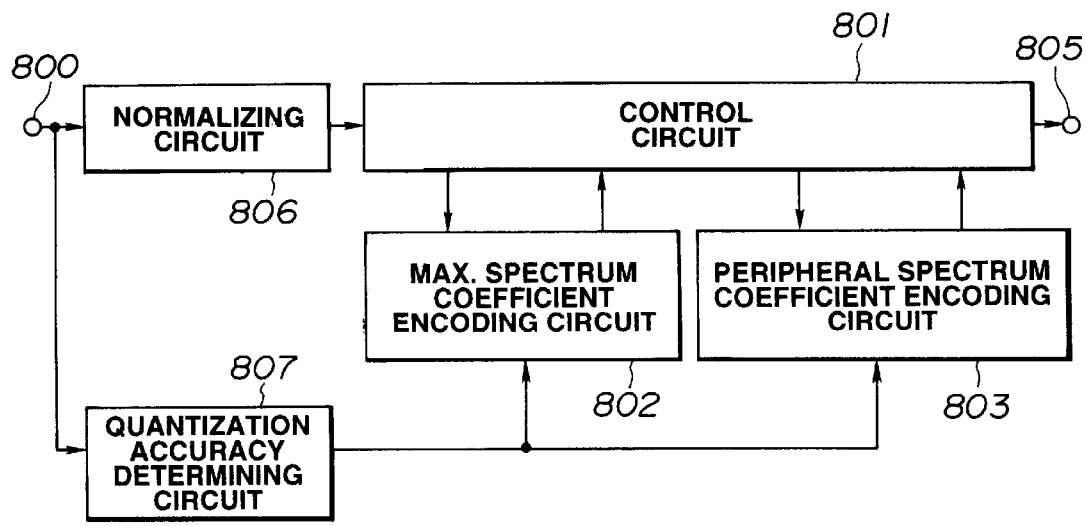
FIG. 12 is a block circuit diagram showing an actual configuration of a tone characteristic encoding circuit.

FIG. 12 shows an actual example of the tone characteristic component encoding circuit 603 in the case where the above-described signal encoding method is applied to the signal encoding apparatus of FIG. 1.

In FIG. 12, a tone characteristic component inputted to terminal 800 is sent to a normalizing circuit 806 and a quantization accuracy determining circuit 807. This normalizing circuit 806 carries out normalization with respect to the inputted tone characteristic component by using normalization coefficient table for tone characteristic component set to a pitch value smaller than that of normalization coefficient table for noise characteristic component as described above. The quantization accuracy determining circuit 807 determines quantization accuracy in accordance with an input signal. A control circuit 801 classifies the inputted tone characteristic component into a maximum spectrum component and peripheral spectrum components by relative position on the frequency base to respectively send them to a maximum spectrum coefficient encoding circuit 802 and a peripheral spectrum coefficient encoding circuit 803 corresponding thereto. The maximum spectrum coefficient encoding circuit 802 outputs signal component code information indicating code of plus or minus of the maximum spectrum signal. Moreover, the peripheral spectrum coefficient encoding circuit 803 outputs signal component information obtained by quantizing respective peripheral spectrum components. Respective encoded outputs from the maximum spectrum coefficient encoding circuit 802 and the peripheral spectrum coefficient encoding circuit 803 are outputted from output terminal 805 through the control circuit 801. It is to be noted that, in an output from the terminal 805, normalization coefficient information in the normalizing circuit 806 and/or quantization accuracy information determined at the quantization accuracy determining circuit 807 are also included. Further, while only codes of plus or minus is transmitted with respect to the maximum spectrum in the above-described example, quantized signal component information may be transmitted similarly to the peripheral spectrum. In addition, signal component information may be fixed length, or variable length as proposed in the specification and the drawings of the previously described International Application No. PCT/JP94/01056 which has not yet been laid open.

Figure 13:
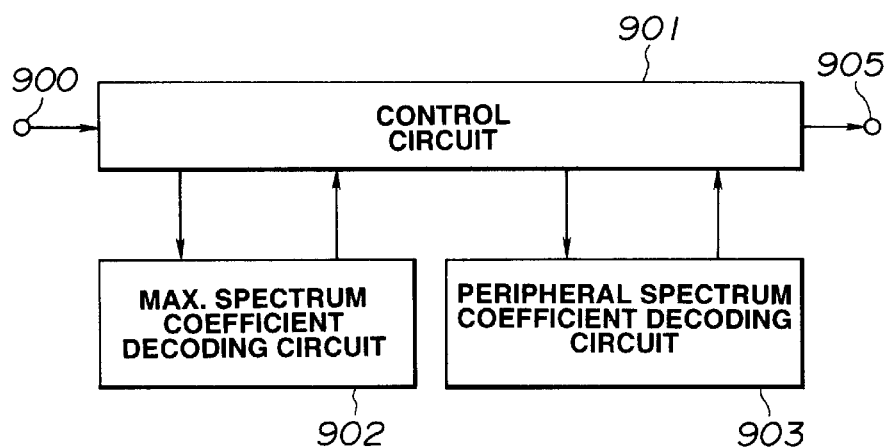
FIG. 13 is a block circuit diagram showing an actual configuration of a tone characteristic decoding circuit.

FIG. 13 shows an actual example of the tone characteristic component decoding circuit 702 in the case where the method of this embodiment is applied to the above-mentioned decoding apparatus of FIG. 2.

In FIG. 13, a tone characteristic component code inputted to input terminal 900 is sent to a control circuit 901. At this control circuit 901, classification corresponding to the classification at the control circuit 801 of FIG. 12 is carried out. The classified tone characteristic component codes are respectively sent to a maximum spectrum coefficient decoding circuit 902 and a peripheral spectrum coefficient decoding circuit 903 corresponding thereto. At these respective decoding circuits 902, 903, decoding operations corresponding to encoding operations at the maximum spectrum coefficient encoding circuit 802 and the peripheral spectrum coefficient encoding circuit 803 of FIG. 12 are respectively carried out. Decoded outputs from respective decoding circuits 902, 903 are outputted from output terminal 905 through the control circuit 801.

Figure 14:
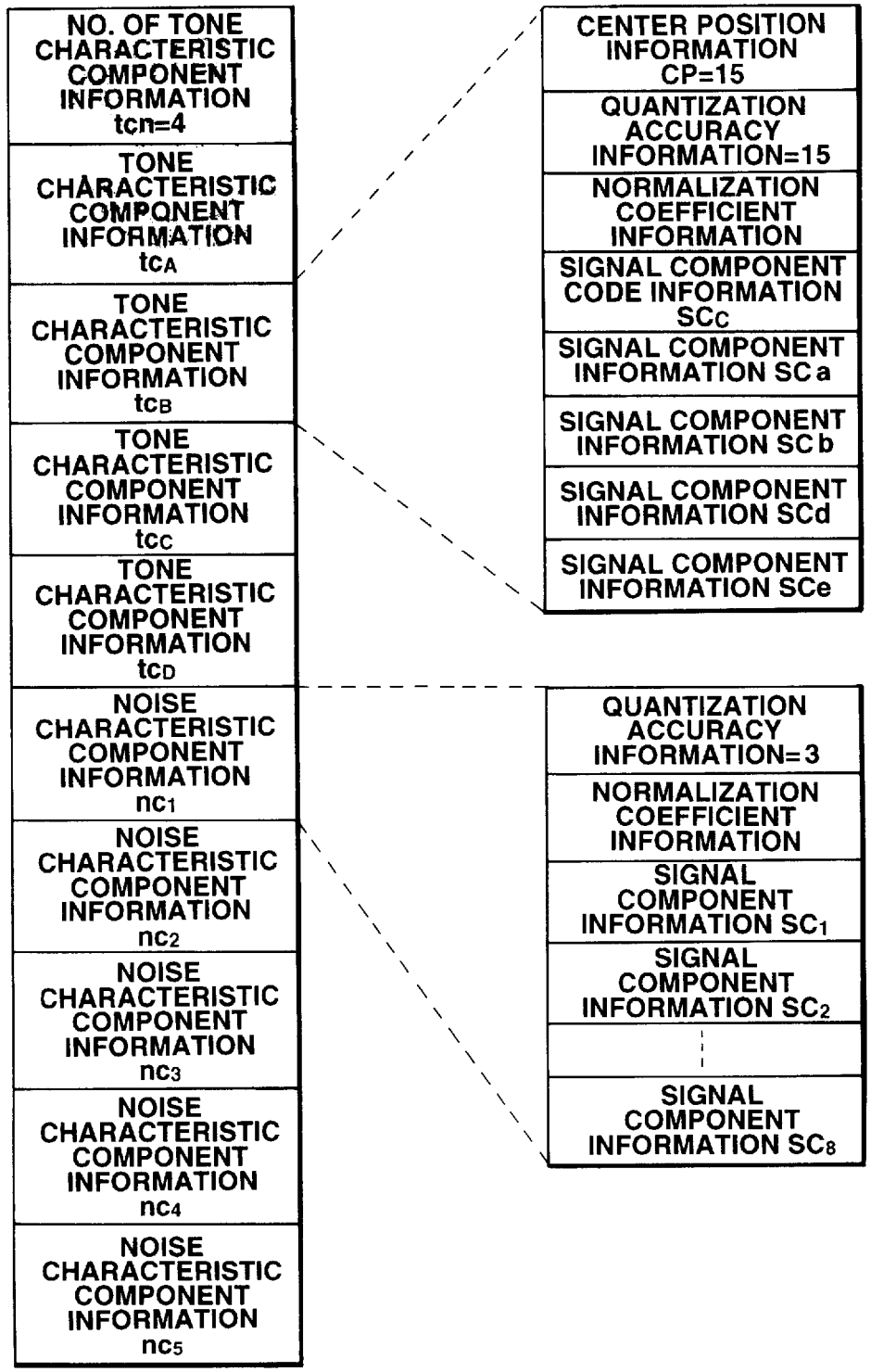
FIG. 14 is a view for explaining recording onto a recording medium of a code train obtained after undergone encoding by the signal encoding apparatus of this embodiment.
Figure 15:
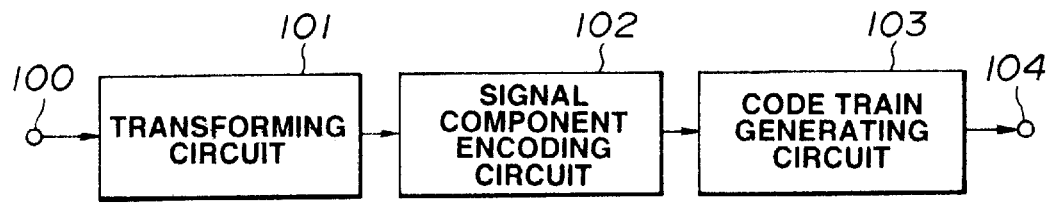
FIG. 15 is a block circuit diagram showing outline of the configuration of a conventional signal encoding apparatus.

FIG. 14 shows the example in the case where spectrum signals of FIG. 4 are encoded by the signal encoding apparatus of this embodiment. Code trains thus obtained are recorded onto (or into) a recording medium of this invention.

In this example, initially, No. of tone characteristic component information tnc (e.g., 4 in the example of FIG. 11) is recorded onto a recording medium. Then, tone characteristic component information $tc_A$, $tc_B$, $tc_C$, $tc_D$ and noise characteristic component information $nc_1$, $nc_2$, $nc_3$, $nc_4$, $nc_5$ are recorded in order recited. In the tone characteristic component information $tc_A$, $tC_B$, $tc_C$, $tC_D$, center position information CP (e.g., 15 in the case of tone characteristic component $tc_B$) indicating position of center spectrum of that tone characteristic component, quantization accuracy information (e.g., 15 in the case of, e.g., tone characteristic component $tc_B$) indicating No. of bits for quantization, normalization coefficient information, and signal component code information $SC_C$ indicating code of plus or minus of the maximum spectrum signal are recorded along with normalized and quantized signal component information $SC_a$, $SC_b$, $SC_d$, $SC_e$. Moreover, with respect to noise characteristic component information $nc_1$, $nc_2$, $nc_3$, $nc_4$, $nc_5$, quantization accuracy information (e.g., 3 in the case of the noise characteristic component information $nc_1$) and normalization coefficient information are recorded along with respective normalized and quantized signal component information $SC_1$, $SC_2$, ..., $SC_8$. Here, center position information CP of tone characteristic component information $tc_B$ indicates position on the frequency base of the maximum spectrum, and quantization accuracy information indicates No. of quantization steps. Moreover, in normalization coefficient information of tone characteristic component information $tc_B$ and normalization coefficient information of noise characteristic component information $nc_1$, set pitch widths of normalization coefficients thereof are different from each other. It is to be noted that while positions of center spectrum components of respective tone characteristic components are used as position information of the tone characteristic component in the above-described example, positions of spectrum components of the lowest frequency band of respective tone characteristic components may be recorded.

It should be noted that there exist various methods for separation between tone characteristic component and noise characteristic component, and several methods are described in the specification and the drawings of the above-mentioned International Application No. PCT/JP94/00880 that the applicant of this application has already proposed. The method of this invention includes those methods and can be applied to all the cases where tone characteristic components are encoded.

Moreover, while a method of allowing tone characteristic components to undergo variable length encoding is described in the specification and the drawings of the previously described International Application No. PCT/JP94/01056 that the applicant of this application has already proposed, the method of this invention may be applied also in this case.

While explanation has been given in the above-described embodiment by mainly taking the example where the method of this invention is applied to the acoustic signal, the method of this invention may be applied also to general waveform signals. It should be noted that the method of this invention is particularly effective for carrying out efficient encoding with respect to acoustic signals in which tone characteristic components have meaning important from a viewpoint of the auditory sense.

Moreover, the recording medium of this embodiment is a recording medium so that encoded information by the above-described signal encoding apparatus of the embodiment of this invention, and includes not only, e.g., disc-shaped recording media (magneto-optical recording media, optical recording media, or phase change type optical recording media, etc.), and tape shaped recording media, but also recording media such as semiconductor memories or IC cards, etc.

As is clear from the foregoing description, in the signal encoding apparatus and the signal encoding method of this invention, since normalization coefficients for normalizing a first signal are set to an interval finer than that of normalization coefficients for normalizing a second signal (i.e., accuracy of normalization coefficients at the time of normalizing tone characteristic components is caused to be higher than accuracy of normalization coefficients at the time of normalizing noise characteristic components), efficient encoding can be made. In other words, accuracy of encoding of tone characteristic components can be improved while suppressing the number of bits required for encoding of noise components. Thus, more efficient encoding can be made as a whole.

Moreover, in the recording medium of this invention, since signals efficiently encoded by the signal encoding apparatus or the signal encoding method of this invention are recorded therein, recording capacity is effectively utilized.

In addition, in the signal decoding apparatus of this invention, since signals encoded by the signal encoding apparatus or the signal encoding method of this invention are decoded, there results less signal error in decoding.

What is claimed is:

1. A signal encoding apparatus adapted for encoding an input signal, the apparatus comprising:

transforming means for transforming the input signal into frequency components;

separating means for separating an output of the transforming means into a first signal consisting of tone characteristic components and a second signal consisting of other components;

first encoding means for normalizing and quantizing the first signal to encode the first signal; and second encoding means for normalizing and quantizing the second signal to encode the second signal, wherein normalization coefficients for normalizing the first signal are set to an interval finer than that of normalization coefficients for normalizing the second signal.

2. A signal encoding apparatus as set forth in claim 1, wherein the first encoding means is such that, with respect to a signal component having a maximum energy of respective tone characteristic components of the first signal, the first encoding means encodes, without encoding a quantized value thereof, a plus or minus sign of the quantized value indicating maximum energy level.

3. A signal encoding apparatus as set forth in claim 2, wherein normalization coefficients for normalizing the first signal in the first encoding means are set to a value such that even if a quantized value of the signal component having the maximum energy is omitted, no error takes place at the time of decoding.

4. A signal encoding apparatus as set forth in claim 1, wherein the input signal is an acoustic signal.

5. A recording medium adapted so that encoded signals are recorded therein, wherein a first signal corresponding to tone characteristic components which have been normalized and quantized and a second signal corresponding to components except for the tone characteristic components, which have been normalized and quantized, are recorded, and wherein normalization coefficients for normalization of the first signal are set to an interval finer than that of normalization coefficients of the second signal.

6. A recording medium as set forth in claim 5, wherein the first signal is such that, with respect to a signal component having a maximum energy of respective tone characteristic components, the first signal includes a plus or minus sign indicating the maximum energy without having a quantized value corresponding thereto.

7. A recording medium as set forth in claim 6, wherein normalization coefficients for normalization of the first signal are set to a value such that even if the quantized value of the signal component having the maximum energy is omitted, no error takes place at the time of decoding.

8. A recording medium as set forth in claim 5, wherein the encoded signal is a signal based on an acoustic signal.

9. A signal decoding apparatus adapted for decoding an encoded signal, the apparatus comprising:

first decoding means for decoding a first signal corresponding to tone characteristic components which have been encoded through normalization and quantization;

second decoding means for decoding a second signal corresponding to components except for the tone characteristic components, which have been encoded through normalization and quantization; and synthetic inverse transforming means for synthesizing an output of the first decoding means and an output of the second decoding means to carry out inverse transform processing thereof to implement inverse transform processing thereto, or for respectively inverse-transforming those outputs to synthesize them, wherein the first decoding means carries out release of normalization at an interval finer than that of the second decoding means.

10. A signal decoding apparatus as set forth in claim 9, wherein the first decoding means decodes a signal component having a maximum energy of respective tone characteristic components on the basis of a plus or minus sign indicating maximum energy.

11. A signal decoding apparatus as set forth in claim 10, wherein normalization coefficients included in the first signal are set to a value such that even if a quantized value of the signal component having the maximum energy is omitted, no error takes place at the time of decoding.

12. A signal decoding apparatus as set forth in claim 9, wherein an output of the synthetic inverse transforming means is an acoustic signal.

13. A signal encoding method for encoding an input signal, the method comprising the steps of:

transforming the input signal into frequency components;

separating the transformed signal into a first signal consisting of tone characteristic components and a second signal consisting of other components;

normalizing and quantizing the first signal to encode the first signal; and normalizing and quantizing the second signal to encode the second signal, wherein normalization coefficients for normalizing the first signal are set to an interval finer than that of normalization coefficients for normalizing the second signal.

14. A signal encoding method as set forth in claim 13, wherein, with respect to a signal component having a maximum energy of respective tone characteristic components of the first signal, a plus or minus sign of a quantized value indicating maximum energy is encoded without encoding the quantized value corresponding thereto.

15. A signal encoding method as set forth in claim 14, wherein normalization coefficients for normalizing the first signal are set to a value such that even if a quantized value of the signal component having the maximum energy is omitted, no error takes place at the time of decoding.

16. A signal encoding method as set forth in claim 13, wherein the input signal is an acoustic signal.

17. A signal encoding apparatus adapted for encoding an input signal, the apparatus comprising:

transforming means for transforming the input signal into frequency components;

separating means for separating an output of the transforming means into a first signal consisting of tone characteristic components and a second signal consisting of other components;

first encoding means for normalizing and quantizing the first signal to encode the first signal; and second encoding means for normalizing and quantizing the second signal to encode the second signal, wherein normalization coefficients for normalizing the first signal are set to an interval finer than that of normalization coefficients for normalizing the second signal, and wherein normalization coefficients for normalizing the first signal in the first encoding means are set to a value such that even if a quantized value of a signal component having a maximum energy of respective tone characteristic components, is omitted, no error takes place at the time of decoding.

18. A signal decoding apparatus adapted for decoding an encoded signal, the apparatus comprising:

first decoding means for decoding a first signal corresponding to tone characteristic components which have been encoded through normalization and quantization;

second decoding means for decoding a second signal corresponding to components except for the tone characteristic components, which have been encoded through normalization and quantization; and synthetic inverse transforming means for synthesizing an output of the first decoding means and an output of the second decoding means to carry out inverse transform processing thereof to implement inverse transform processing thereto, or for respectively inverse-transforming those outputs to synthesize them, wherein the first decoding means carries out release of normalization at an interval finer than that of the second decoding means, and wherein normalization coefficients included in the first signal are set to a value such that even if a quantized value of a signal component having a maximum energy of respective tone characteristic components is omitted, no error takes place at the time of decoding.

19. A signal decoding method for decoding an encoded signal, the method comprising the steps of:

decoding a first signal corresponding to tone characteristic components which have been encoded through normalization and quantization;

decoding a second signal corresponding to components except for the tone characteristic components, which have been encoded through normalization and quantization; and synthesizing the decoded first signal and the decoded second signal to carry out inverse transform processing thereof to implement inverse transform processing thereto, or for respectively inverse-transforming the decoded first signal and the decoded second signal to synthesize them, wherein the decoding of the first signal is carried out with a release of normalization at an interval finer than that of the decoding of the second signal.

20. A signal decoding method as set forth in claim 19, wherein the decoding of the first signal comprises decoding a signal component having a maximum energy of respective tone characteristic components on the basis of a plus or minus sign indicating maximum energy.

21. A signal decoding method as set forth in claim 20, wherein normalization coefficients included in the first signal are set to a value such that even if a quantized value of the signal component having the maximum energy is omitted, no error takes place at the time of decoding.

22. A signal decoding method as set forth in claim 19, wherein an output of the synthetic inverse transform processing is an acoustic signal.

* * * * *